(12) United States Patent
Shankar

(10) Patent No.: US 11,265,635 B2
(45) Date of Patent: Mar. 1, 2022

(54) WEARABLE COMMUNICATION DEVICE

(71) Applicant: Lazy Design Private Limited, Maharashtra (IN)

(72) Inventor: Apoorv Shankar, Maharashtra (IN)

(73) Assignee: LAZY DESIGN PRIVATE LIMITED, Maharashtra (IN)

( * ) Notice: Subject to any disclaimer, the term of this patent is extended or adjusted under 35 U.S.C. 154(b) by 0 days.

(21) Appl. No.: 16/982,432

(22) PCT Filed: Mar. 20, 2019

(86) PCT No.: PCT/IB2019/052246
§ 371 (c)(1),
(2) Date: Sep. 18, 2020

(87) PCT Pub. No.: WO2019/180626
PCT Pub. Date: Sep. 26, 2019

(65) Prior Publication Data
US 2021/0058692 A1 Feb. 25, 2021

(30) Foreign Application Priority Data
Mar. 21, 2018 (IN) .............................. 201821010444

(51) Int. Cl.
*H04R 1/00* (2006.01)
*H04R 1/02* (2006.01)
*G06F 1/16* (2006.01)
*G06F 3/01* (2006.01)

(52) U.S. Cl.
CPC .............. *H04R 1/028* (2013.01); *G06F 1/163* (2013.01); *G06F 3/014* (2013.01); *H04R 2201/02* (2013.01)

(58) Field of Classification Search
CPC ..... H04R 1/028; H04R 2201/02; G06F 1/163; G06F 3/014
USPC .......................................................... 381/334
See application file for complete search history.

(56) References Cited

U.S. PATENT DOCUMENTS

| | | | |
|---|---|---|---|
| 8,934,952 B2 | 1/2015 | LeBoeuf et al. | |
| 2006/0056650 A1* | 3/2006 | Hofmann | H04R 1/023 381/338 |
| 2010/0184487 A1* | 7/2010 | Takada | H04R 3/00 455/569.1 |

(Continued)

*Primary Examiner* — Ammar T Hamid
(74) *Attorney, Agent, or Firm* — D'Ambrosio & Menon, PLLC; Usha Menon

(57) ABSTRACT

Disclosed is a ring shaped wearable communication device (ring) for a user's finger. The ring includes: a sound sensor that detects ambient sound levels; a speaker that produces sound in human audible frequency range per at least one signal received, wherein intensity of the sound produced is based on the ambient sound level; an out port; and a hollow channel with an increasing cross-section that wraps around the finger, wherein: smaller cross-section end of the hollow channel is connected to the speaker and the other end of the hollow channel is connected to the out port to provide a horn-like structure; the out port and the hollow channel are configured to reduce the mismatch between the acoustic impedance of air immediately outside the out port and the acoustic impedance as seen by the speaker just outside the speaker; and the out port emits sound received from the speaker as directional sound in close vicinity of the user's hand.

10 Claims, 23 Drawing Sheets

(56) References Cited

U.S. PATENT DOCUMENTS

2015/0002387 A1* 1/2015 Cai .................. G06F 3/014
                                                    345/156
2015/0117643 A1* 4/2015 Best ................ H04W 12/03
                                                    380/46

* cited by examiner

WEARABLE COMMUNICATION DEVICE

FIELD OF DISCLOSURE

The present disclosure relates to the field of wearable devices, and more particularly, to a wearable device to facilitate communications.

BACKGROUND OF THE DISCLOSURE

Background description includes information that may be useful in understanding the present invention. It is not an admission that any of the information provided herein is prior art or relevant to the presently claimed invention, or that any publication specifically or implicitly referenced is prior art.

As a result of the monumental progress of smart-phone technology, the function of smart-phones are no longer constrained to just answering phone calls and sending messages, but also taking photos, acting as a personal digital assistant, playing media and allowing wireless communications. Aside from that, smart-phones have the normal functions of receiving and sending e-mail, surfing the Internet and being able to connect to Wi-Fi, 2G, 3G, 4G, and LTE.

User use smartphones on a daily basis for various tasks, the most important of which is taking phone calls. But there are times, when accessing the smartphones is not easy, for example, a lady in a crowded place keeps her phone in her handbag, If a phone call comes, she would not be able to hear it and even if she does, taking the phone out of the handbag takes time and unnecessary effort for a task we do so regularly. Similarly, people sitting in a metro, bus or train struggle to take their phone out of their pockets as our phones have become too big in size. Missing a phone call because it took a long time to take the ringing phone in hand should not be a problem in this age. Because of the form of the smartphones we use today, it is not easy to access them in a very short time. In both the cases, the time taken to take the phone from a pocket or handbag to the user's hand near the mouth and effort made to get the task done remains about the same.

To solve the above problem, electronic industries come up with wired and wireless earphone for people taking a lot of phone calls for long durations. These devices are not used by many people as wearing something on the head or face is not preferred by many users, additionally, people who take frequent but shorter phone calls prefer using a phone instead of earphones. Further there have been studies that say the electromagnetic radiation of phones are harmful for the human brain and keeping the phone near the head for too long may cause brain cancer. Thus, people should avoid taking phone calls directly from their phones.

Also, voice based interfaces like Siri by Apple Inc. and Google Assistant by Google Inc., USA has seen less acceptance by users than the projected demand. One reason for this is that the user has to take his/her phone out from the pocket/handbag and keep it near the mouth to say a voice command in a noisy environment which is both a long and effort taking process, people may also find it awkward to talk to a computer program like Siri in public on loudspeakers and many people choose to use the phone's touchscreen instead since they have already taken the phone in their hand which may also be a faster way to get the desired task done.

Efforts have been made in related art to address above stated problem by use of smart watch, wrist band, ring that interacts with the smartphone. An example of such is presented by Sgnl smartwatch band (by Innomdle Labs). This is a wrist worn band connected wirelessly to the smartwatch or the phone which has a microphone and a bone conduction actuator housed inside. The band let users take phone calls by placing their finger on their ear. The sound travels in the form of mechanical vibrations from the band to the wrist to the fingers to reach the user's ear. This approach is quite inefficient as significant attenuation of sound happens because of the vibrations having no direction and getting transmitted to all parts of the hand, major part of the sound signal ultimately getting lost or absorbed by the body. Also, the user is required to press his/her finger against the ear tightly to hear the sound properly. The band needs to be tightly worn on the wrist too so the mechanical vibrations from the bone conduction speaker are transferred to the hand properly.

Another wrist worn band is offered by PH Technical Labs. This wrist worn band has a removable Bluetooth based unit with a speaker attached to it. This unit is wirelessly connected to the smartphone and the speaker produces sound in the audible range. Because of the construction and placement of the unit on user's wrist, the output port of this speaker emits audible sound focused towards the user's ear when the user keeps his/her hand over the ear. The company claims that the user's hand acts as a parabolic reflector for the sound which helps focusing the sound towards the user. The sound on the other side of the hand is very less, enabling the user to take phone calls privately with their hand.

This approach requires the user to direct his/her wrist towards the ear when taking phone calls which may always not be comfortable for the user as user may wish to flex the hand in different angles with respect to the wrist. Also, since sound coming from this speaker has to travel a distance equivalent to the size of a hand, the sound has to be loud enough to reach user's ear which makes the method less efficient. Also, there is a chance that sound becomes audible to people who are in close proximity of the user because of the higher sound level required to be produced to make it reach user's ear.

An example of phone call taking smart ring is presented by Orii Smart ring. This ring wirelessly connects to a smartphone and makes use of bone conduction actuators to transmit sound from the ring to the user's ear when he/she presses the finger against their ear. The sound travels as mechanical vibrations through the finger. This approach is better at efficiency since the distance travelled by the sound is lesser, but again there is no directionality of sound and the sound may travel towards the hand from the finger as well where it again, gets absorbed by the body. The user still has to press his/her finger against the ear to get a clear sound, which requires effort and the ring should be tightly worn around the finger to avoid losses in transmitting the sound.

Another way to take phone call through a ring like wearable is to place a small speaker inside the ring such that when the user places his hand over his ear such that the ring almost touches the ear, the user can hear sound from the speaker and take phone calls through the ring. The problem with this approach is the sound generated by such a speaker is not directional, and so the user has to place his whole hand over his ear to take calls from the ring. Holding the hand in such a position requires considerable use of the shoulder muscle and it can be painful when the hand is held in such a position for a long time. Thus, simply placing a speaker inside the ring is not a very convenient way to take phone calls through a wearable device.

Bluetooth headsets are also frequently used. But however the Bluetooth headset is fixed on the ear, the headset supplies limited functionality of answering or dialing phone calls as the user can not view or move the headset. A headset is also placed around the user's ears, which is in close proximity with the user's face and many people like to avoid wearing gadgets near their face. Headsets are also not very comfortable to use for long durations and have to removed and carried around. An inconvenience with taking calls from a smart-watch is that the user has to use both hands to control the smart-watch and requires one hand on which the watch is worn held near the user's mouth so as to take a phone call on a loudspeaker, which is again inconvenient in public spaces. Therefore, figuring out a way to conveniently provide the benefits of phone and more without the above mentioned inconveniences is a worthy concern.

As elaborated, despite development of smart watch, headsets or wearable device technology, there remains a need for an improved and efficient wearable communication device which can be used in conjunction with a smartphone easily and let users receive phone calls in a more convenient way. The device should enable a user to take phone calls very easily and with minimal effort. Further, the device should be able to offer the user multiple other functions besides just handling a phone call, and enable user interaction with voice based assistants privately and easily.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about". Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

OBJECTS OF THE INVENTION

An object of the present disclosure is to provide to a device with a ring shape (interchangeably termed herein as wearable communication device or wearable device) that is capable of being worn on the finger of a user to let the user handle phone calls by placing his/her fingers near his/her ear.

Another object of the present disclosure is to provide a wearable communication device that is capable of being controlled by voice, motion, orientations, buttons or a touch panel set on the surface thereof so as to provide a corresponding functions to a user.

Another object of the present disclosure is to provide a wearable communication device to enable the user interact with and/or control external electronic devices.

Another object of the present disclosure is to provide a wearable communication device to notify the users of an incoming phone call received on mobile or smartphone.

SUMMARY

This summary is provided to introduce simplified concepts of a wearable communication device elaborated herein, which are further described below in the Detailed Description. This summary is not intended to identify key or essential features of the claimed subject matter, nor is it intended for use in determining/limiting the scope of the claimed subject matter.

The present disclosure relates to a wearable device to facilitate communications. More particularly it relates to a ring shaped wearable device capable of being worn on the finger of a user to enable the user communicate with a computing device. The wearable device is capable of generating a focused beam of audible sound in a particular direction in close vicinity of the device letting it be used as a private phone receiving device, and can be controlled by voice, motion, orientations, buttons or a touch panel set on its surface so as to provide corresponding functions to a user.

In an aspect, present disclosure elaborates upon a ring shaped wearable communication device (ring) configured to be worn on a finger of a user's hand. The ring can include: a sound sensor (mic) configured to detect ambient sound level; a speaker configured to produce sound in human audible frequency range per at least one signal received, wherein intensity of the sound produced can be based on the ambient sound level; an out port; and a hollow channel with an increasing cross-section configured to wrap around the finger, wherein: smaller cross-section end of the hollow channel can be connected to the speaker and the other end of the hollow channel can be connected to the out port to provide a horn-like structure; the out port and the hollow channel can be configured to reduce mismatch between acoustic impedance of air immediately outside the out port and acoustic impedance as seen by the speaker just outside the speaker; and the out port can emit sound received from the speaker as directional sound in close vicinity of the user's hand.

In another aspect, the ring can include at least one microphone and a connection circuit to enable two-way communication and connection between the ring and a computing device the ring can be operatively connected to; wherein the speaker can produce the sound in human audible frequency range based on signals received from the computing device, and the at least one microphone can transfer sound of the user to the computing device; and wherein the connection circuit can use any of wired or wireless means.

In yet another aspect, the ring can include at least one sensor configured to provide at least one corresponding function to the user.

In an aspect, the directional sound can be configured for, based upon any or a combination of sound produced by the speaker and actions performed by the user on or in vicinity of the ring, any or a combination of: operating any or a combination of an external device, a computer application, and a lock, and carrying encrypted information.

In another aspect, computing device can be a smart phone and the ring can be configured to receive a notification from the smart phone upon receipt of a phone call at the smart phone, and accept the notification to enable the two-way communication, wherein the acceptance can be based on an action performed by the user on the ring.

In yet another aspect, the ring can be configured to have a plurality of the out ports at different locations on the hollow channel.

In an aspect, the speaker can be configured to provide the sound after removing and/or adding at least one other signal of a pre-determined frequency, using Digital Signal Processing on the at least one signal.

In another aspect, the at least one sensor can include any or a combination of a voice sensor, a motion sensor, an orientation sensor, a touch sensor, a vibration sensor and a proximity sensor.

In yet another aspect, the proximity sensor can facilitate secure data communication among any or a combination of a plurality of the rings and at least one computing device.

In an aspect, present disclosure elaborates upon a ring shaped wearable communication device (ring) configured to be worn on a finger of a user's hand. The ring can include: a sound sensor (mic) configured to detect ambient sound level; a speaker configured to produce sound in human audible frequency range per at least one signal received, wherein intensity of the sound produced can be based on the ambient sound level; an out port; and a hollow channel having a tube with an increasing cross-section configured to wrap around the finger wherein: smaller cross-section end of the tube can be connected to the speaker and the other end of the tube can be connected to the out port to provide a horn-like structure; the out port and the tube can be configured to reduce mismatch between acoustic impedance of air immediately outside the out port and acoustic impedance as seen by the speaker just outside the speaker; and the out port can emit sound received from the speaker as directional sound in close vicinity of the user's hand.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

Various objects, features, aspects and advantages of the present disclosure will become more apparent from the following detailed description of preferred embodiments, along with the accompanying drawing figures in which like numerals represent like features.

BRIEF DESCRIPTION OF DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure. The diagrams are for illustration only, which thus is not a limitation of the present disclosure, and wherein.

DETAILED DESCRIPTION

Figure 1:
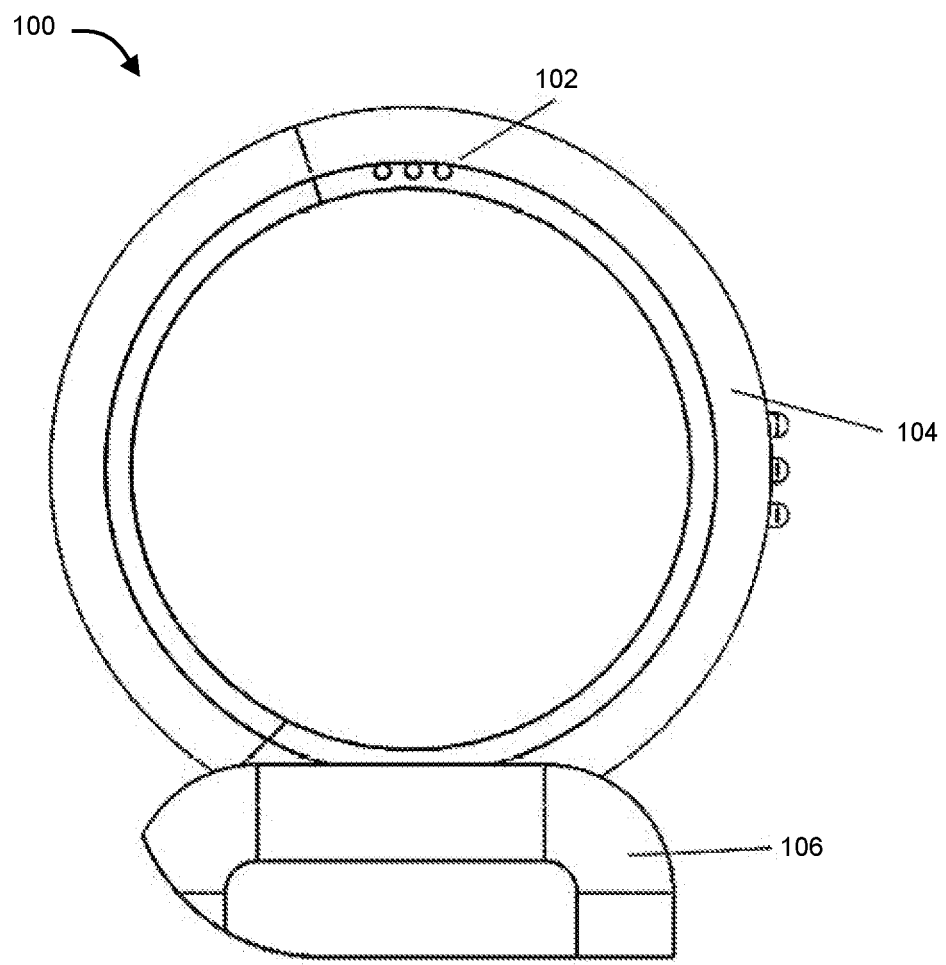
FIGS. 1-10 illustrate proposed wearable communication device with various components incorporated in it in accordance with exemplary embodiments of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the scope of the present disclosure as defined by the appended claims.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Exemplary embodiments will now be described more fully hereinafter with reference to the accompanying drawings, in which exemplary embodiments are shown. These exemplary embodiments are provided only for illustrative purposes and so that this disclosure will be thorough and complete and will fully convey the scope of the invention to those of ordinary skill in the art. The invention disclosed may, however, be embodied in many different forms and should not be construed as limited to the embodiments set forth herein. Various modifications will be readily apparent to persons skilled in the art. The general principles defined herein may be applied to other embodiments and applications without departing from the scope of the invention. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Various terms as used herein are shown below. To the extent a term used in a claim is not defined below, it should be given the broadest definition persons in the pertinent art have given that term as reflected in printed publications and issued patents at the time of filing.

The present disclosure relates to a wearable device to facilitate communications. More particularly it relates to a ring shaped wearable device capable of being worn on the finger of a user to enable the user communicate with a computing device. The wearable device is capable of generating a focused beam of audible sound in a particular direction letting it be used as a private phone receiving device, and can be controlled by voice, motion, orientations, buttons or a touch panel set on its surface so as to provide corresponding functions to a user.

In an aspect, present disclosure elaborates upon a ring shaped wearable communication device (ring) configured to be worn on a finger of a user's hand. The ring can include: a sound sensor (mic) configured to detect ambient sound level; a speaker configured to produce sound in human audible frequency range per at least one signal received, wherein intensity of the sound produced can be based on the ambient sound level; an out port; and a hollow channel with an increasing cross-section configured to wrap around the finger, wherein: smaller cross-section end of the hollow channel can be connected to the speaker and the other end of the hollow channel can be connected to the out port to provide a horn-like structure; the out port and the hollow channel can be configured to reduce mismatch between acoustic impedance of air immediately outside the out port and acoustic as seen by the speaker just outside the speaker; and the out port can emit sound received from the speaker as directional sound in close vicinity of the user's hand.

In another aspect, the ring can include at least one microphone and a connection circuit to enable two-way communication and connection between the ring and a computing device the ring can be operatively connected to; wherein the speaker can produce the sound in human audible frequency range based on signals received from the computing device, and the at least one microphone can transfer sound of the user to the computing device; and wherein the connection circuit can use any of wired or wireless means.

In yet another aspect, the ring can include at least one sensor configured to provide at least one corresponding function to the user.

In an aspect, the directional sound can be configured for, based upon any or a combination of sound produced by the speaker and actions performed by the user on or in vicinity of the ring, any or a combination of: operating any or a combination of an external device, a computer application, and a lock, and carrying encrypted information.

In another aspect, computing device can be a smart phone and the ring can be configured to receive a notification from the smart phone upon receipt of a phone call at the smart phone, and accept the notification to enable the two-way communication, wherein the acceptance can be based on an action performed by the user on the ring.

In yet another aspect, the ring can be configured to have a plurality of the out ports at different locations on the hollow channel.

In an aspect, the speaker can be configured to provide the sound after removing and/or adding at least one other signal of a pre-determined frequency, using Digital Signal Processing on the at least one signal.

In another aspect, the at least one sensor can include any or a combination of a voice sensor, a motion sensor, an orientation sensor, a touch sensor, a vibration sensor and a proximity sensor.

In yet another aspect, the proximity sensor can facilitate secure data communication among any or a combination of a plurality of the rings and at least one computing device.

In an aspect, present disclosure elaborates upon a ring shaped wearable communication device (ring) configured to be worn on a finger of a user's hand. The ring can include: a sound sensor (mic) configured to detect ambient sound level; a speaker configured to produce sound in human audible frequency range per at least one signal received, wherein intensity of the sound produced can be based on the ambient sound level; an out port; and a hollow channel having a tube with an increasing cross-section configured to wrap around the finger wherein: smaller cross-section end of the tube can be connected to the speaker and the other end of the tube can be connected to the out port to provide a horn-like structure; the out port and the tube can be configured to reduce mismatch between acoustic impedance of air immediately outside the out port and acoustic impedance as seen by the speaker just outside the speaker; and the out port can emit sound received from the speaker as directional sound in close vicinity of the user's hand.

The present disclosure relates to field of communication devices, and, more specifically, relates to an electronic device with a ring shape or wearable communication device or wearable device (hereinafter interchangeably referred as an electronic device with a ring shape or wearable communication device or wearable device or ring) that is capable of being worn on the finger of a user to let him/her take phone calls just by placing their fingers near the ear and communicate with a computing device. Also, the wearable communication device can provide various functions to the user by means of voice, motion, orientations, buttons or a touch panel set on the surface thereof.

In an aspect, the wearable device can be in form of a ring worn on any finger of the user and can be connected wirelessly to a phone or computing device of the user, such as the user's mobile device/smart phone/smart watch.

In an aspect, the wearable device can have one or more parts or components operatively connected with each other. In another aspect, the ring can have a front casing, a band (in shape of a circle) and an out port for sound. In another aspect, the front casing can be used to hold many different electronic components that cannot be held in the small and round sized sections of the circular band of the ring. In another aspect, the band/ring shaped portion of the wearable device can be with an open able or lockable section to ease wearing of the ring by the user and adjust the ring's size/diameter/grip as per user's finger size. In another aspect, the out port of the wearable device can be connected with a loudspeaker housed inside the ring through a channel or tube that can be configured inside the band to physically connect the out port with the speaker output structure in such a manner as to avoid any leakage of sound in unintended directions.

In an aspect, the electronic components enclosed inside the front casing can be selected from any or combination of a wireless connection module, a power source, one or more microphone, one or more loudspeaker and sensor or indicative mechanism.

In an aspect, the wireless connection module can connect with the smartphone or computing device via a wireless connection. In an aspect, the speaker can produce sound in the audible range i.e. 20,000 Hz to 20,000 kHz. In an aspect, the sensor or indicative mechanism can notify/alert users about phone notifications. The wireless connection can transfer sound generated at the computing device (for instance, that of an incoming call when the computing device is a smartphone) to the speaker.

An aspect of the present disclosure relates to a method. The method can include the steps of: receiving, by a phone, a connection request over a telephone network from a caller; transmitting, by the phone, a notification associated with the connection request to a wearable device, wherein the wearable device intimates a user about the notification through a sensory or an indicative mechanism; and responding, by the user, through the wearable device, to the connection request from the caller, wherein the responding is any one of accepting the connection request and rejecting the connection request.

Another aspect of the present disclosure relates to a wearable device, preferably, worn on a figure of a user. The wearable device is configured to receive a notification associated with a connection request from a phone (mobile device), wherein the wearable device intimates a user about the notification through a sensory or an indicative mechanism, and thereby respond, based on one or more user gesture/activities to the connection request from the caller, wherein the responding is any one of accepting the connection request and rejecting the connection request.

In contrast to the conventional electronic device, the present invention provides a wearable ring-shaped electronic device/wearable device or communication device which is usable with one hand to take advantage of the flexibility of one's finger, avoid phone drop, and supply multiple functions to the user. Further the wearable device enables a user to interact with a smartphone with voice assistants privately and easily. Furthermore the wearable device can be worn on a finger, can be connected wirelessly to a telecommunication device and can enable a user take phone calls privately by placing his/her fingers near his/her ear. The incoming sound generated by the telecommunication device (pertaining to the incoming voice of a phone call) can get focused towards the user's ear because of the placement/redirection of output of the speaker on the ring by the out port.

In an embodiment, an electronic device in form of a ring worn on any finger of the user connected wirelessly to a phone to interact with the phone. The ring can enclose a small speaker that produces sound in the audible range. When the user places the finger on which ring is worn or the whole hand near the ear, the sound is outputted from an orifice/out port on the ring that opens in the direction of the palm and is physically connected to the speaker output through a hollow channel, sound travelling through this hollow channel comes out through the out port with increases focus or directionality and can be further reflected by the user's palm, fingers and face profile such that major part of the sound stays inside this volume created by the user's hand and side of the face, thus, preventing ingress in this volume of external sound. Additionally, the intensity of sound coming from the speaker is modified based on the ambient noise in the environment through a sound sensor (interchangeably termed as mic herein) that receives the ambient noise. This way, the user is able to hear the voice coming from the ring routed from the phone privately enabling user to take phone calls with their fingers or hand on which ring is worn.

In an embodiment, the wearable device can have an orifice/port that can emit sound received by the device in such a manner that when the user's hand is properly positioned on the user's ear, the emitted/outputted sound is reflected by the user's palm, fingers and face profile such that major part of the sound stays inside a volume/space created by the user's hand and side of the face, thus, reducing the sound transfer outside this space to a minimum. Upon being operatively connected to a smartphone for instance, in this manner the user is able to hear the voice coming from the ring routed from the phone privately, enabling the user to take phone calls with his/her finger on which the wearable device is worn.

The ring may also have a vibration transducer to notify users of phone notifications. The positions of the speaker and the microphone inside the ring may change as per different embodiments of the ring.

Various embodiments of the present invention include a ring that is configured to be worn on a first finger of a user. The ring includes one or more components for capturing user input and/or for providing output to the user. As the term is used herein, "finger" means any finger of a user, including thumb, fore or index finger, middle finger, ring finger, and pinky finger of either hand. In some embodiments, the ring is preferably worn on the user's index finger of the user's predominant hand. The user may use the ring to control one or more external electronic devices (interchangeably termed as remote devices) such as a smart television, cellular telephone, laptop computer, tablet computer, automobile audio or telephone system, game console, smart watch, automation devices or any other such device.

In an aspect, sound output enabled by the ring can be focused in a particular direction through the ring's design. In this manner, the ring/wearable device enables feature of Near Field Directional Sound technology. This focused sound can be used in multiple applications including payments and unlocking devices by transmitting sound which contains an encrypted signal.

In another aspect, the ring may employ a touch pad, touch screen, microphone, or motion sensors to capture user input via touches, audio commands, or hand gestures. In some embodiments, the user controls the device/ring using a second finger (one of a thumb, fore or index finger, middle finger, ring finger, and pinky finger of either hand, different from the first finger). In those embodiments where the ring is worn on the user's index finder, the user will generally control the device/ring using the thumb of that same hand. In some embodiments, the device/ring provides feedback to the user via speech or other audio or haptic feedback (e.g., vibrations), or via a display. Control of the device/ring here can also include control of various features of a smartphone/smart-watch or a computing device associated with the proposed ring.

FIG. 1 illustrates proposed wearable communication device with in accordance with an exemplary embodiment of the present disclosure.

In an embodiment, the wearable communication device/ring 100 can have a front casing 106, a band 104 and sound out port 102 (hereinafter interchangeably referred as sound port or out port for sound or out port) for sound. In another embodiment, the front casing 106 can be used to hold many different electronic components that cannot be held in the small and round sized sections of the band of the ring. In an exemplary embodiment, the electronic components enclosed inside the front casing 106 can be selected from any or combination of a wireless connection module, a power source, one or more microphone, one or more loudspeaker and sensor or indicative mechanism. In another embodiment, the band 104 can have an openable or lockable section which may ease wearing of the ring by the user and adjust the ring's grip as per user's finger size. The band 104 can also have a space for the sound out port 102 on the opposite side of the front casing 106 through which sound comes out from the ring. The position of the sound out port 102 can change with different embodiments of the ring. The band 104 may have a hollow cross section or a filled cross section. One side (say one half) of the band 104 can be hollow and the other can hold a touch sensor circuitry for user-ring interaction. In another embodiment, the sound comes out from the sound out port 102 (interchangeably referred as out port) of the ring. The out port 102 of the ring 100 can be connected to the speaker housed inside the ring (in front casing 106) through a channel or tube (as further elaborated) that physically connects the speaker output structure and the out port 102 of the ring 100 to avoid any leakage of sound in unintended directions. In an exemplary embodiment, the out port 102 can be made of one or more holes. As shown in FIG. 1, the out port 102 can have 3 holes.

In an exemplary embodiment, the wireless connection module (that can be configured in front casing 106, interchangeably referred as the wireless communication module) can include a wireless communication chip and a communication antenna. In this embodiment, the wireless communication chip is a bluetooth chip, though the present invention is not limited to it. For example, even though the wireless communication module of the present invention utilizes a bluetooth function, there are many other wireless communication options that can be used, such as 2G, 3G, Wi-Fi, or infrared communication chips. The remote device(s) mentioned above (could be a wireless controlled television, router, cell phone, computer, game system or cell phone base station. The wireless communication module further comprises a proximity data exchange chip. The present invention could use the proximity chip to communicate with other nearby devices of the same type, wherein the communication could be used for exchanging business cards or simultaneously playing music. Furthermore, the user could use the safe exchange between the proximity chip of the present invention and that of an external device such as a smart phone the ring can be operatively connected to (using wireless communication module, for instance) to replace the required security measures of passwords, codes, graphs or other bio-sensors of today's cell phones.

In an embodiment, since existing speakers with the required power are not small enough to be enclosed inside a hollow band of a ring this small, structures like the front casing can be designed to hold them. In an exemplary embodiment, a very small speaker can be placed just below the out port 102 so that sound from the speaker directly comes out from port 102. In this case the sound coming from the out port 102 will not be focused but will still undergo reflections from the fingers, face and hand of the user and the user will be able to hear it, although the sound coming from the speaker this way may propagate in other directions as well hindering the privacy of the phone call.

In an exemplary embodiment, the ring 100 can also be connected wirelessly with any other smart device like a smart speaker. In this case, the smart speaker transmits the audio signals to the ring wirelessly to let the user take a phone call or listen to music or use voice commands privately without holding any article in his/her hand. In another exemplary embodiment, the ring 100 can be connected to or communicate with other devices using any suitable method or hardware (such as adapters). Connections can be wireless and/or wired. Methods include USB, FireWire, HDMI, Ethernet, Wi-Fi, cellular, infrared (IR), near-field communication (NFC), RFID, parallel devices, serial devices, modems, etc.

In addition, the ring further can include audio circuitry, speaker, and microphone provide an audio interface between a user and device. Audio circuitry receives audio data, converts the audio data to an electrical signal, and transmits the electrical signal to speaker. Speaker converts the electrical signal to human-audible sound waves. Audio circuitry also receives electrical signals converted by microphone from sound waves. Audio circuitry converts the electrical signal to audio data and transmits the audio data to peripherals interface for processing. Audio data is, optionally, retrieved from and/or transmitted to memory and/or RF circuitry by peripherals interface. In some embodiments, audio circuitry also includes a headset jack. The headset jack provides an interface between audio circuitry and removable audio input/output peripherals, such as output-only headphones or a headset with both output (e.g., a headphone for one or both ears) and input (e.g., a microphone).

In an exemplary embodiment, the ring 100 can include power system or power source for powering the various components. Power system optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices. The recharging system may be configured to receive wired power (from, e.g., a micro-USB charger) or wireless power transmitted via electromagnetic waves.

In some embodiments, the user is notified of transmission of the command (or local execution of the command) by issuing haptic feedback via haptic actuator to the finger of the user bearing the ring. The haptic feedback may be, for example, a vibration or pulse. In other embodiments, the notification is an audio one; in still other embodiments, no notification is given. In other embodiments audio, visual, and/or haptic feedback is provided to the user.

It should be appreciated that, the embodiment of the ring discussed here are exemplary and the design of the ring can also consist of only a band which encloses all electronic circuitry including the speaker, one or more microphones, power source, wireless module, user interaction module like a motion sensor or touch sensor.

It may be appreciated that, one or more microphones or one or more loudspeaker driver producing sound of varying frequencies in the audible range to be transmitted through multiple different hollow channels in the ring or wireless connection module or sensor or indicative mechanism or power source or any electronic circuit or microcontroller can be enclosed by any or combination of the front casing, the band.

Figure 2:
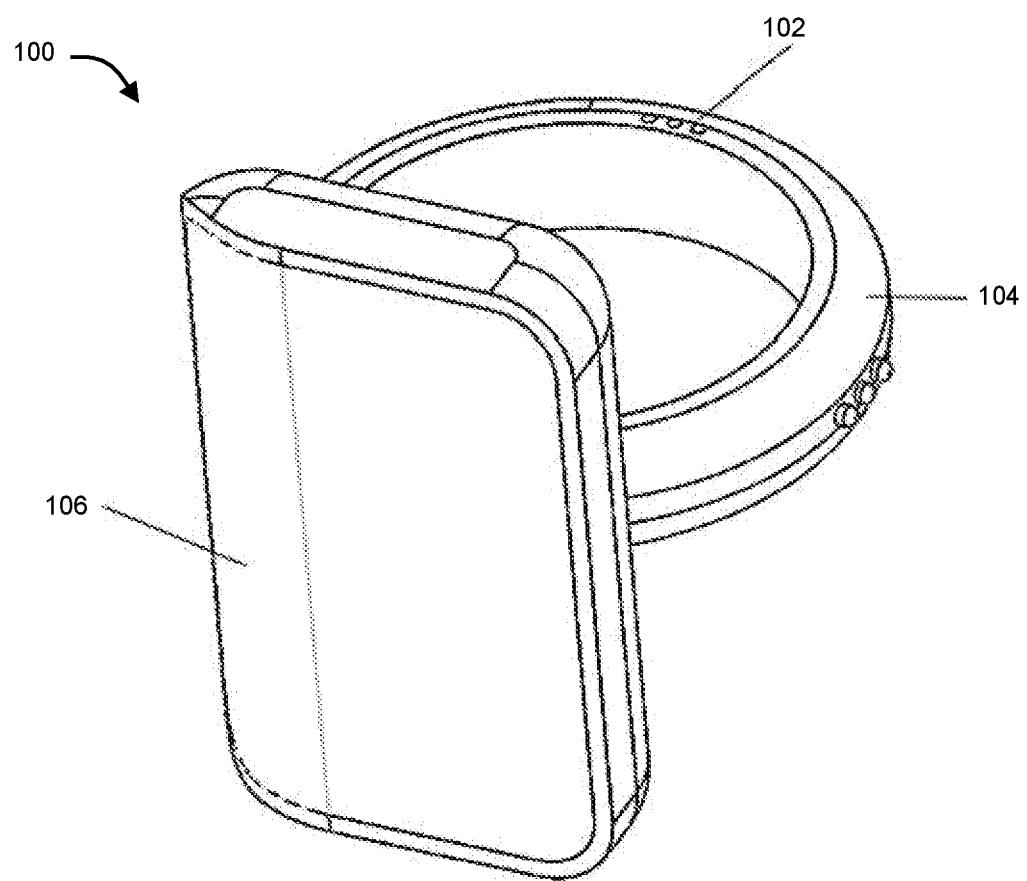

FIG. 2 illustrates proposed wearable communication device 100 with various components incorporated in it, in accordance with an exemplary embodiment of the present disclosure.

FIG. 2 illustrates the same structure as FIG. 1 with a different angle. In an exemplary embodiment, the front casing can include one or more gemstones.

Figure 3:
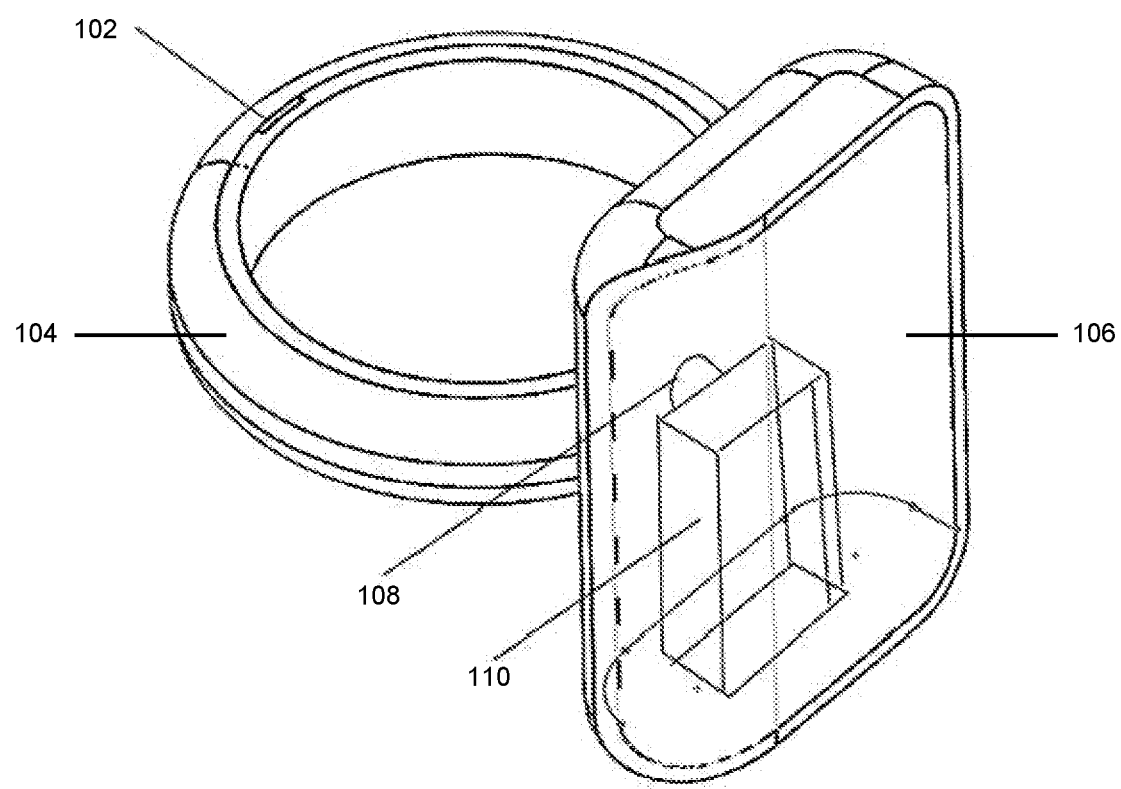

FIG. 3 illustrates proposed wearable communication device 100 with various components incorporated in it, in accordance with an exemplary embodiment of the present disclosure.

In an embodiment, the sound out port 102 can be a small slit instead of holes. FIG. 3 also shows the position of the speaker 110 enclosed inside the front casing 106 of the ring. FIG. 3 illustrates the output port of the speaker 108 for transmission of the sound to the hollow section of the band.

Figure 4:
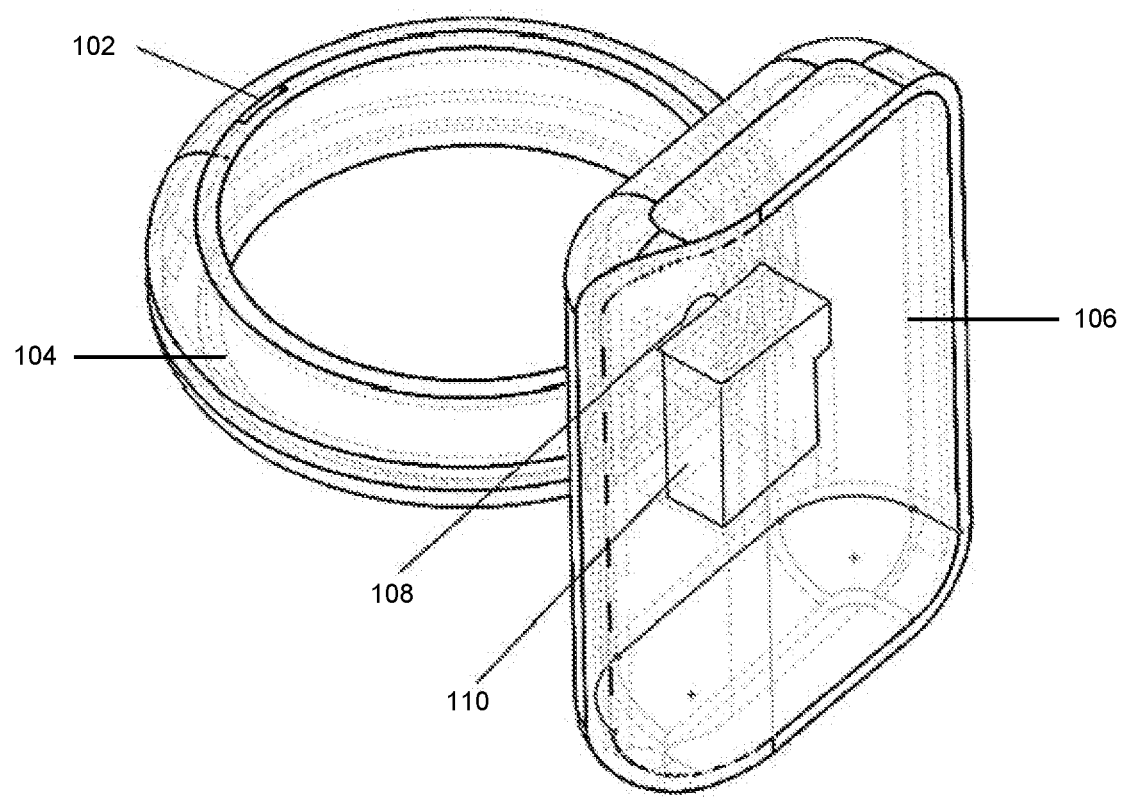

FIG. 4 illustrates proposed wearable communication device, in accordance with an exemplary embodiment of the present disclosure.

In an embodiment, the sound out port 102 can be a small slit instead of holes. FIG. 4 also shows the position of the speaker 110 housed inside the front casing 106 of the ring. FIG. 4 illustrates the output port of the speaker 108 for transmission of the sound to the hollow section of the band. FIG. 4 illustrates the same structure as FIG. 3, but there is a difference of location and size of the speaker. The design and position of the speaker enclosed inside the front casing can be varied as per the requirement.

Figure 5:
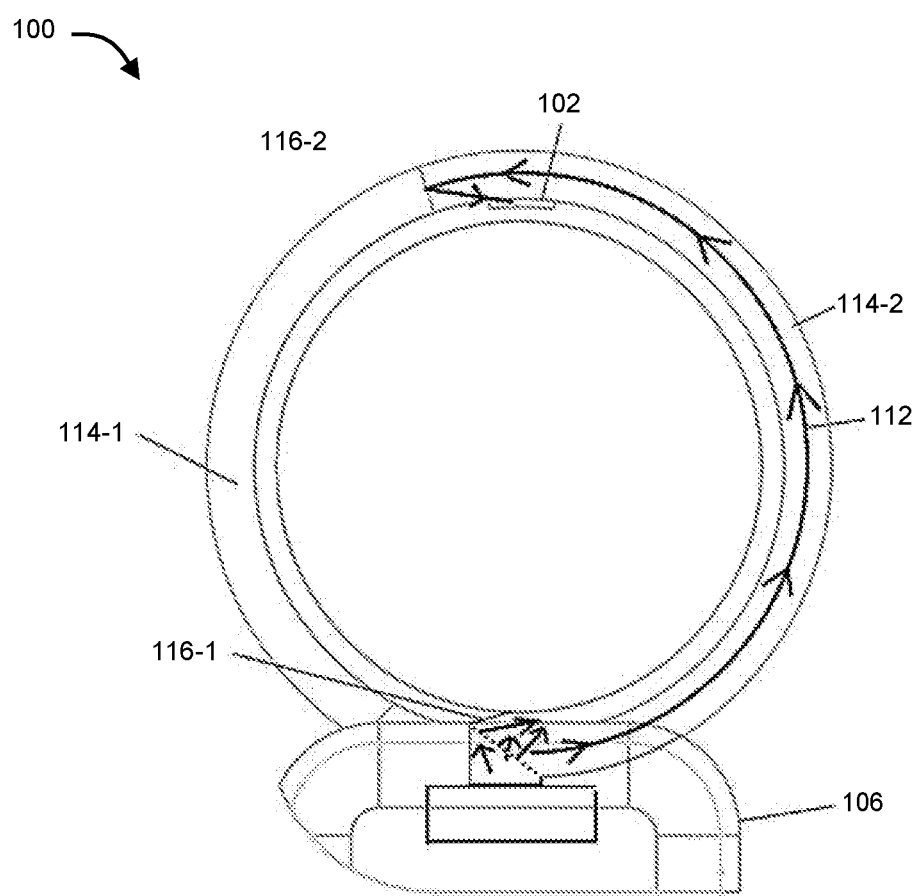

FIG. 5 illustrates how sound can travel in proposed wearable device, in accordance with an exemplary embodiment of the present disclosure.

FIG. 5 illustrates transmission of the sound 112 from the front casing output of the speaker (interchangeably referred as speaker out port) to the ring out port 102 through a hollow channel (shown as 114-2) through which the sound travels from the speaker output to the ring out port 102. The tubular structure of the channel gives a focused direction to the sound coming out of the out port 102. The opening or the out port 102 and the hollow channel 114-2 is designed to reduce mismatch between the acoustic impedance of air just outside the out port 102 and the acoustic impedance as seen by the speaker just outside the speaker so as to maximize sound transfer from the speaker to user's ear and reduce attenuation of sound that travels through the hollow channel.

This happens because the hollow channel acts as a load to reduce the acoustic impedance seen by the speaker before the sound is let out in the air outside the hollow channel in order to match the acoustic impedance of this air to maximize sound transmission. This is based on the fact that free air has a lower acoustic impedance and sound driver of the speaker has a higher acoustic impedance, mismatch of these impedances creates losses in sound transmission from the speaker to the air.

It can readily be understood that the hollow channel 114-2 can as well enclose a tube similar to channel 104-2 on which out port 102 and speaker out port 108 can similarly be configured as on the hollow channel being described herein, with similar results.

The tubular horn like structure also gives the sound coming from the speaker a certain direction when it comes out of the out port by transforming the high pressure, low velocity vibrations (sound) at the speaker output into low pressure, high velocity vibrations (sound) that can be efficiently radiated into the air.

FIG. 5 depicts Section 114-2 which is a tubular hollow structure whereas the other side is a Section 114-1 which is a solid body. Section 116-1 and 116-2 are solid walls that can reflect most of the sound incident on them from air. It may be appreciated that the hollow channel 114-2 can have any suitable shape or size to transmit the sound.

Figure 6:
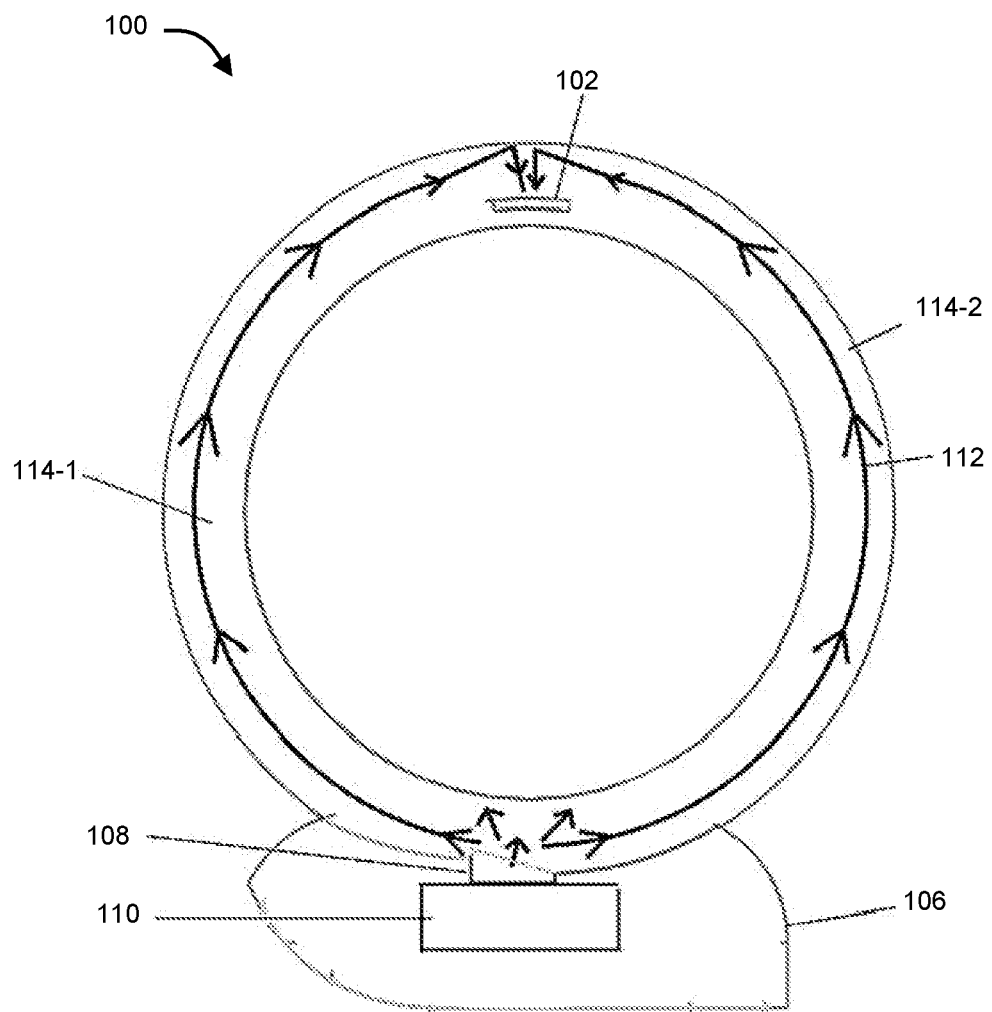

FIG. 6 illustrates how sound can travel in another exemplary embodiment of the proposed wearable communication device in accordance with an exemplary embodiment of the present disclosure.

FIG. 6 illustrates transmission of the sound 112 from the front casing output of the speaker or speaker out port 108 (interchangeably referred as speaker out port) to the sound out port 102. In an embodiment, the speaker's direct output port or speaker out port 108 can be connected to the sound out port 102 (interchangeably referred as out port or sound port or out port for sound) through a sealed tubular structure that starts from the front casing, wherein the sealed tubular structure is configured to extend through one side of the band and finish at the sound out port 102 of the ring such that almost all sound coming from the direct output of the speaker reaches the out port 102. The tubular structure of the channel also gives a focused direction to the sound coming out of the out port as opposed to sound coming out of a speaker that gets transmitted in all directions equally. In an embodiment, the other side of the band may have one or more sensors for user interaction with the ring.

FIG. 6 illustrates the band 104 that can act as a hollow tubular structure. Both section B1 114-1 and section B2 114-2 can be hollow and sound can travel from the direct output of the speaker housed inside the front casing to both tubular structures 114-1 and 114-2 to reach at out port 102. It may be appreciated that the band 104 can have hollow structure with any shape or size to transmit the sound.

Figure 7:
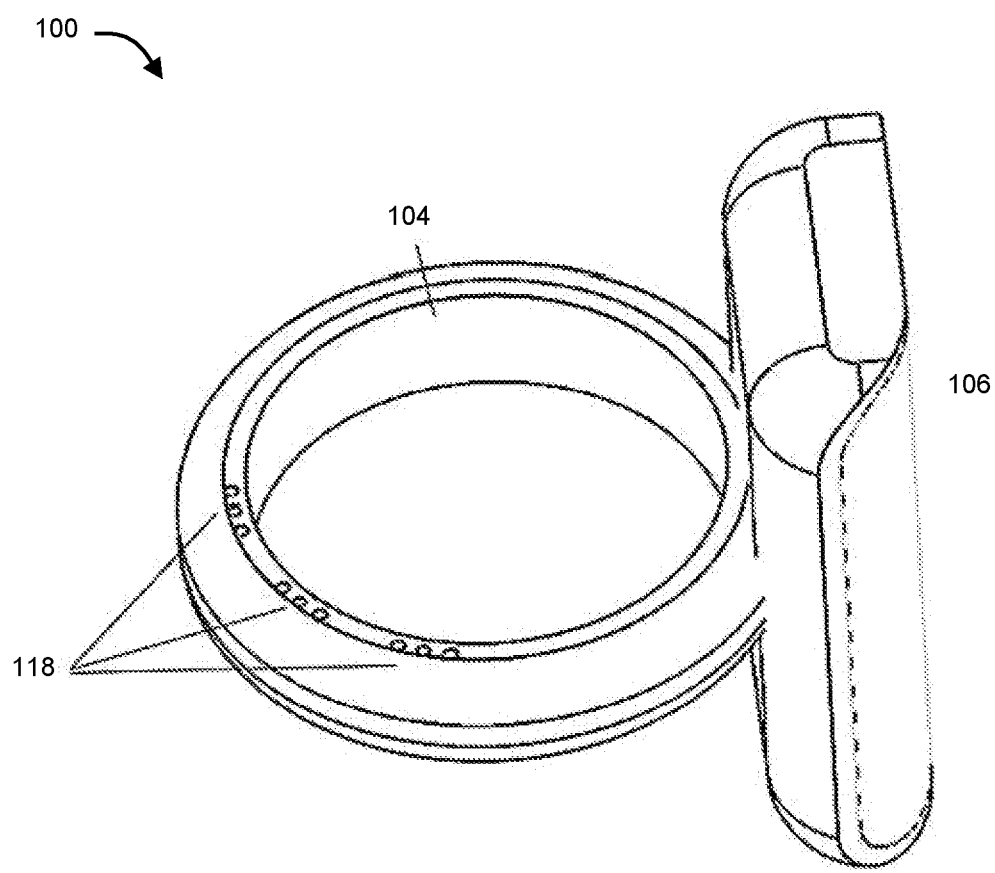

FIG. 7 illustrates proposed wearable communication device in accordance with an exemplary embodiment of the present disclosure.

FIG. 7 illustrates similar features or embodiment as FIG. 1 but FIG. 7 depicts the ring with 3 out ports 118 for sound instead of one as shown in FIG. 1. In an exemplary embodiment, the design of the out ports may change as per different simulation criteria.

Figure 8:
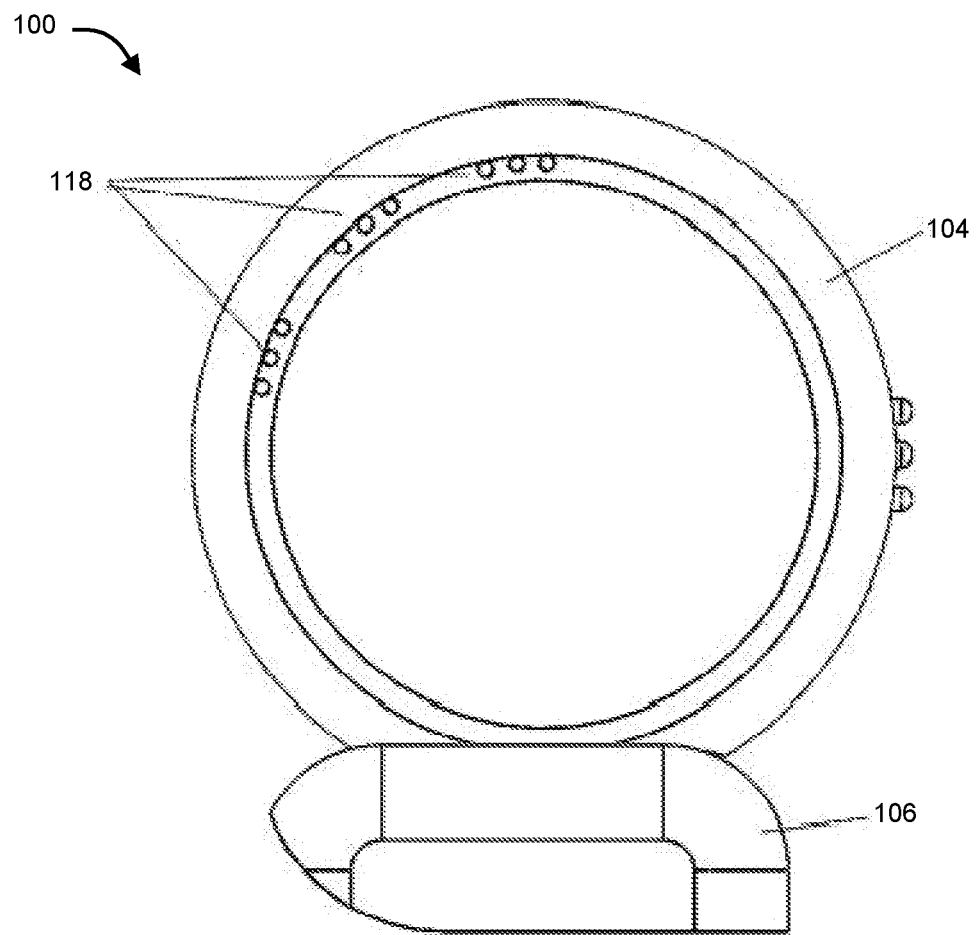

FIG. 8 illustrates proposed wearable communication device in accordance with an exemplary embodiment of the present disclosure.

FIG. 8 illustrates the same structure as FIG. 7 with a different angle. It shows similar features or embodiment as FIG. 1 but depicts the ring with 3 out ports 118 for sound instead of one as shown in FIG. 1. In an exemplary embodiment, the design of the out ports may change as per different simulation criteria.

Figure 9:
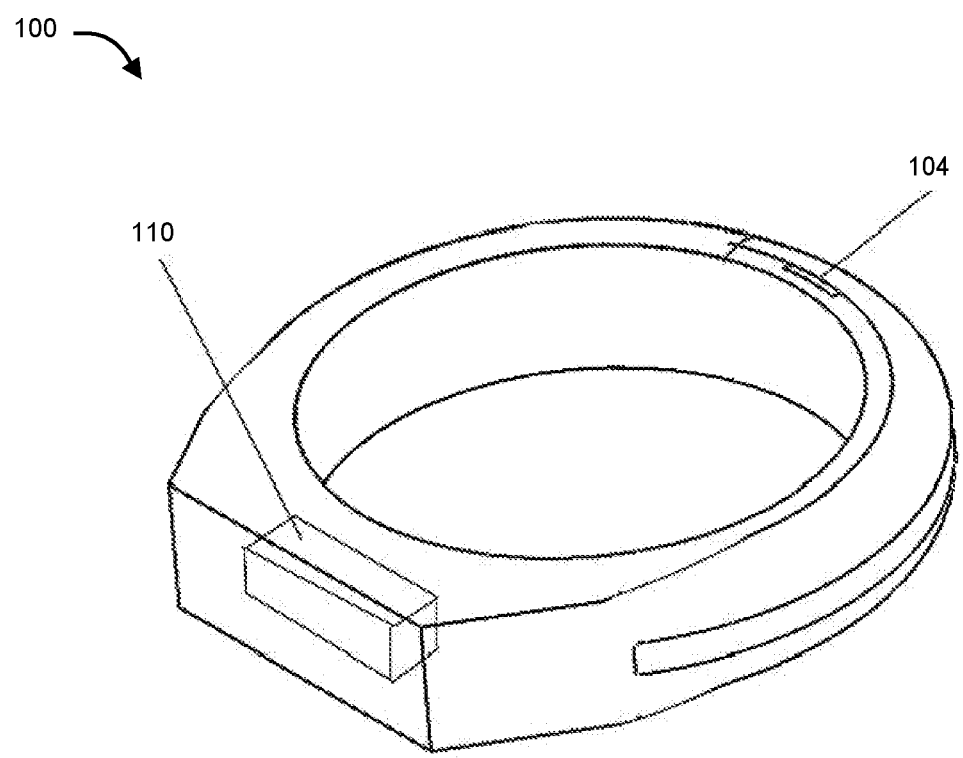

FIG. 9 illustrates proposed wearable communication device in accordance with an exemplary embodiment of the present disclosure.

As shown in FIG. 9 the front casing 106 of the ring can be merged with the band 104 part of the ring in a new design. The speaker 110 and all electronic circuitry enclosed inside the front casing 106 can be housed inside this extended front structure of the band; the sound again travels through the tubular structures of the band to reach out port.

Figure 10:
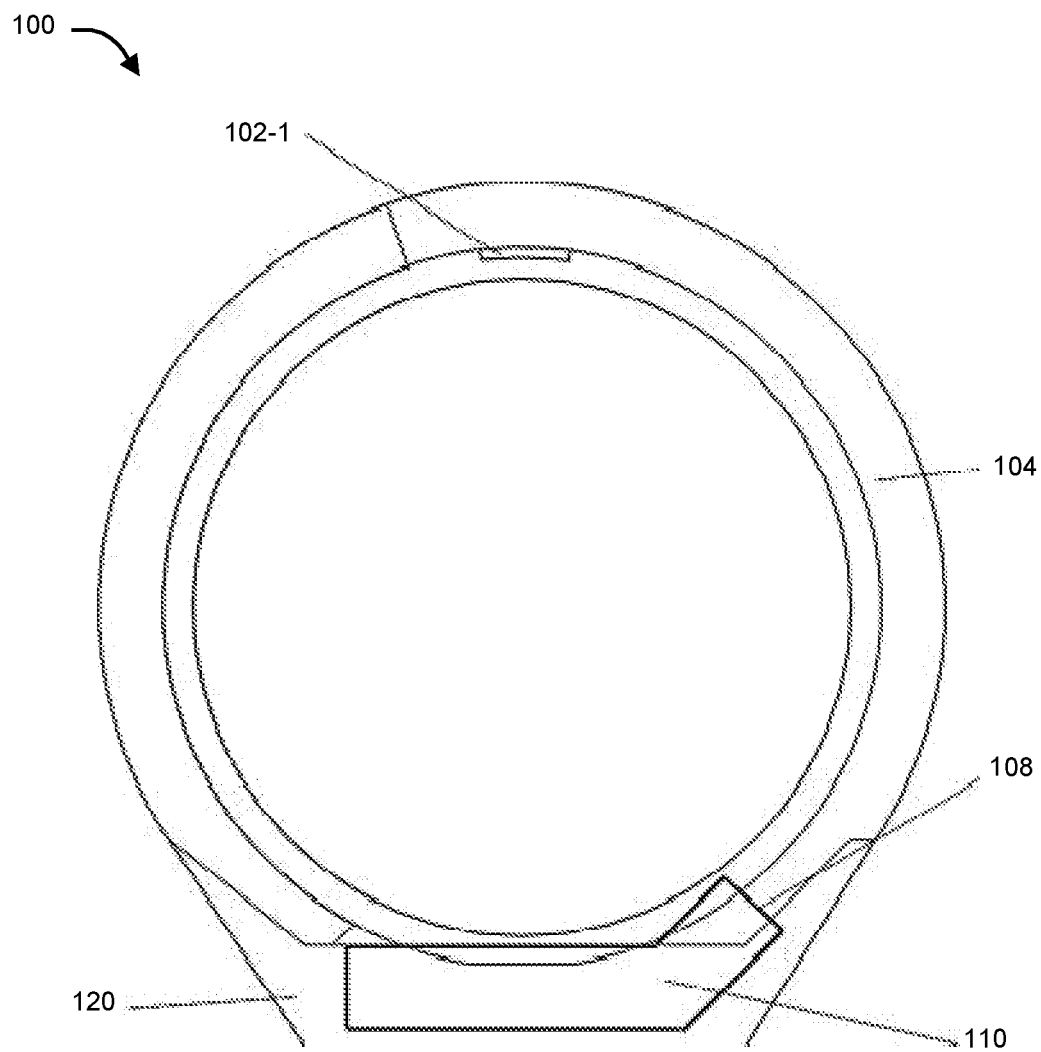

FIG. 10 illustrates proposed ring or wearable communication device in accordance with an exemplary embodiment of the present disclosure.

FIG. 10 depicts a different type of speaker 110 enclosed in front casing ring whose output or speaker out port 108 can open directly into the tubular structures of the band without the need of any reflectors or cavities to hold the speaker.

Figure 11:
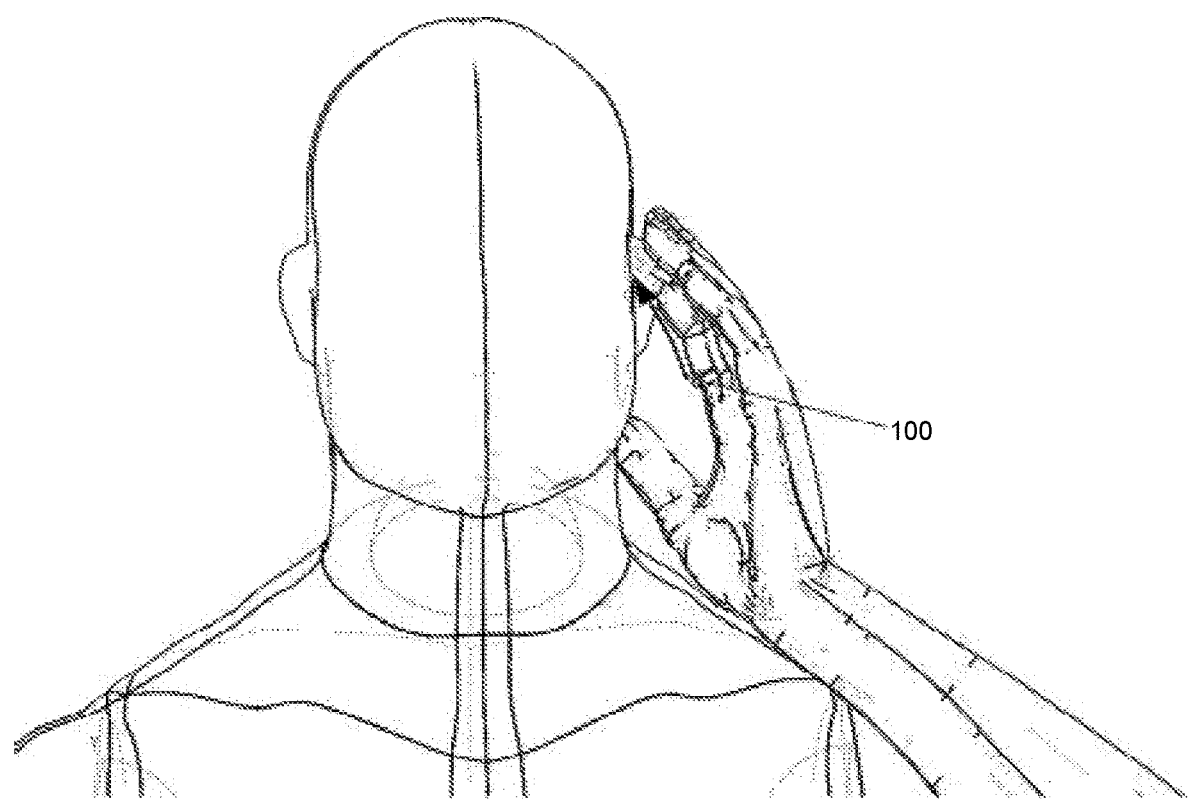
FIGS. 11-16 illustrate exemplary working of the proposed ring or wearable communication device when worn by a user, in accordance with exemplary embodiments of the present disclosure.

FIG. 11 illustrates exemplary working of the proposed communication device, in accordance with an exemplary embodiment of the present disclosure.

In an embodiment, the ring 100 can be constructed in such a way that the out port for the speaker housed inside the ring can be positioned on the in-side of the hand when a user is wearing the ring. Here, in-side refers to the part of the ring that is closer to the palm of user's hand.

Figure 12:
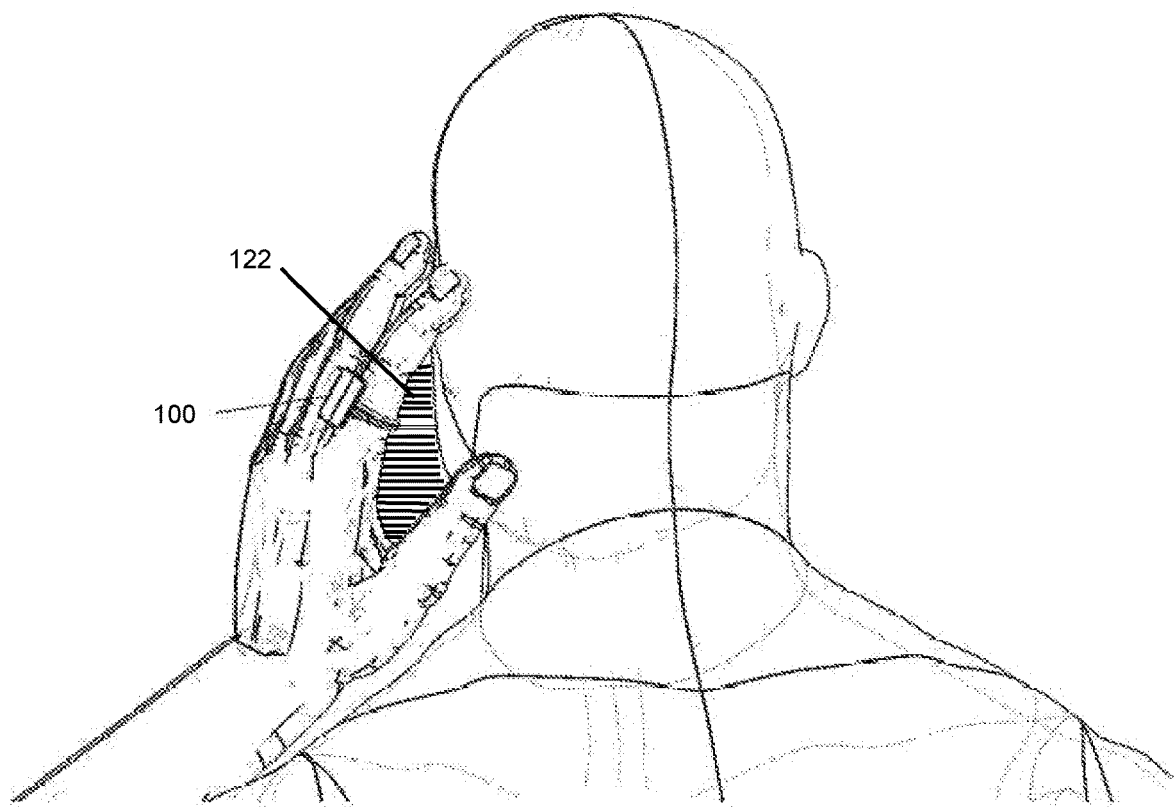

FIG. 12 illustrates proposed wearable communication device and how a space with maximum sound may be created using it in accordance with an exemplary embodiment of the present disclosure.

FIG. 12 depicts back view of ring 100 worn on the user's hand with all finger's covering the ear.

Figure 13:
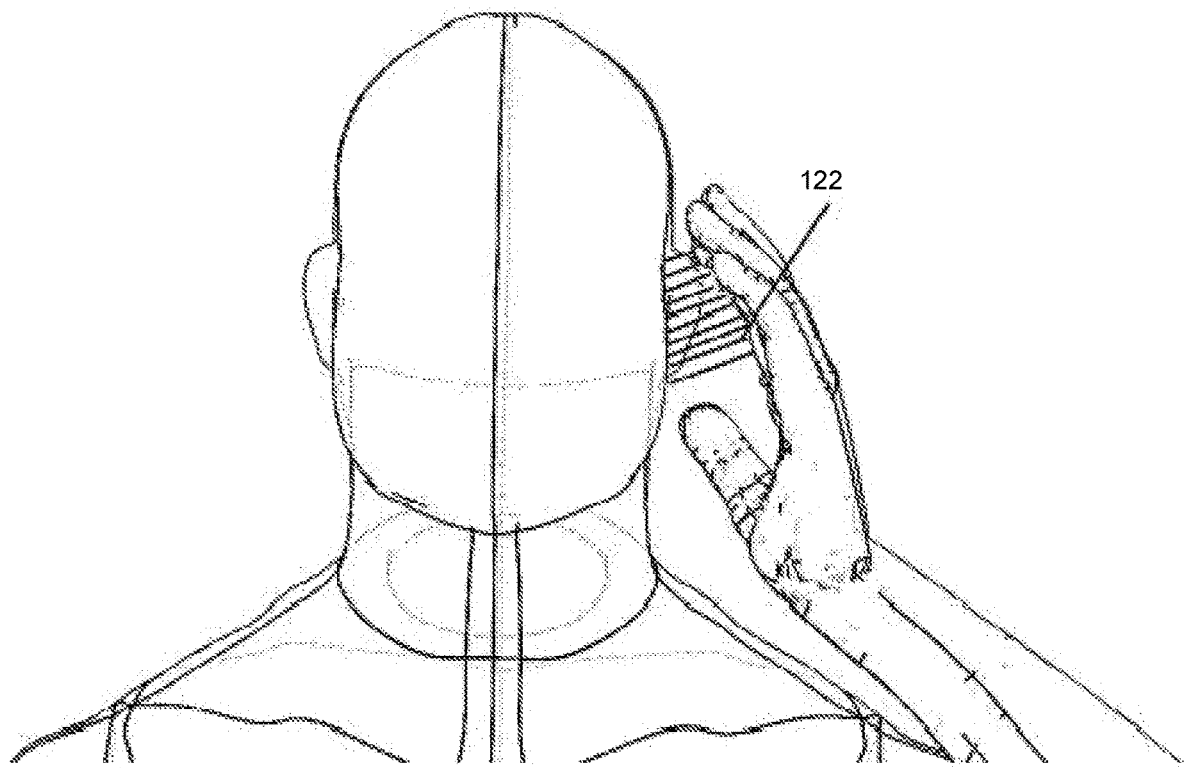

As shown in FIG. 12 the user wears the ring 100 on the index finger. The user wearing the ring on the index finger and raising his hand such that his fingertips just touch the area near his ear. This position of hand creates a space of maximum sound coming from the sound out port of the ring and most of the sound coming out goes towards the user's ears. The sound heard outside the area/space 122 (as shown in FIG. 13) is very less as most of the sound gets reflected by user's palm, fingers and the face to stay inside the enclosed area. When the sound heard outside area 122 A1 is negligible, as compared to the ambient sound in the environment, the phone call from the ring becomes completely private as nobody in proximity of the user can hear the sound coming from the ring.

FIG. 13 illustrates working of the proposed ring or wearable communication device, in accordance with an exemplary embodiment of the present disclosure.

In an exemplary embodiment, the ring 100 can be constructed in such a way that the out port for the speaker housed inside the ring can be positioned on the in-side of the hand when a user is wearing the ring. Here, in-side refers to the part of the ring that is closer to the palm of user's hand. When sound can be produced through the speaker and the user keeps the hand on which the ring is worn near his/her ear, the sound coming out from this out port gets reflected by all solid bodies around the space enclosed by the user's hand and the side profile of the face such that this sound effectively gets focused towards the user's ear and the user can hear the sound coming from the speaker privately. There is some sound which leaks out of this enclosed area (122) i.e. the area of maximum sound as shown in FIG. 13 but the intensity of this leaked sound remains negligible as compared to the intensity of sound heard in area 122 enclosed by the hand and the face because of the reflection of this sound from the in-side of user's hand.

In another exemplary embodiment, when the user is getting a phone call, the ring can act as a wireless telephonic system with a speaker and a microphone connected wirelessly to the phone. Sound coming from the transmitting end is received by the user through the ring's speaker as focused sound towards the ear when he/she places his/her hand towards the ear as shown in FIG. 13. The microphone on the ring can be positioned to receive user's voice and send it to the other end of the phone call via the wirelessly connected smartphone. The input interactions done by the user to accept/reject calls or interact with other sound based applications on the ring can be gesture based interactions like flicking the finger in different directions or it can be touch based interactions on different parts of the ring where a touch sensing module is embedded in the ring. Thus, just by swiping up on the ring from another finger, placing the hand on the ear as seen in FIG. 13, the user can take phone calls privately without letting anyone in close proximity of the user overhearing the conversation. And the user can do this without touching his/her phone.

In an exemplary embodiment, the ring can notify/alert the users about the incoming phone call or message or notification or audio message by vibration, haptic feedback or lights. For example—the ring 100 can have one or more sensor or indicative mechanism. For instance the ring can include a vibration module, haptic module, notification module and a light or LED or a Display housed inside the ring connected to the wireless electronic module.

In alternate exemplary embodiments, the design and position of the sound out port can be based on simulations done for maximum sound output in area 122 as shown in FIG. 13 considering factors like sound reflection in the audible range, facial profiles of users, typical position of hands placed on ear, number of fingers touching the ear, etc. Different rings with different such designs and positions can be made for various such conditions, all using the basic concepts and constructional features being described herein.

Figure 14:
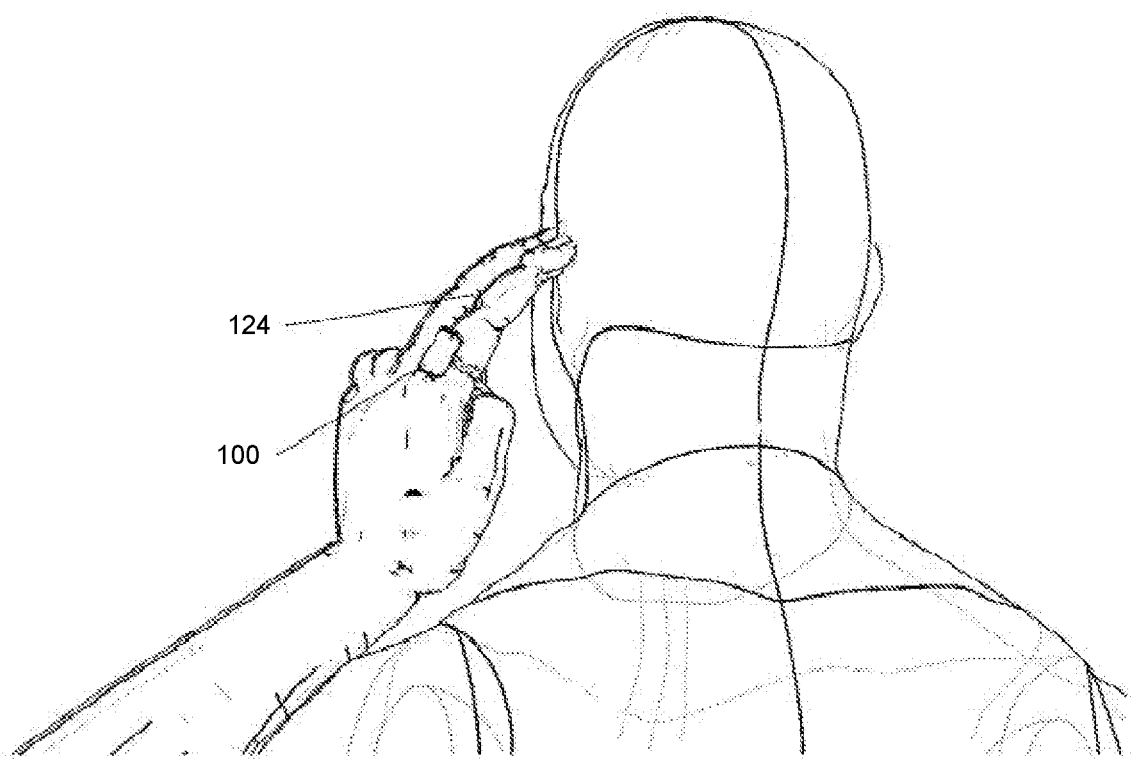

FIG. 14 illustrates working of the proposed wearable communication device, in accordance with an exemplary embodiment of the present disclosure.

FIG. 14 illustrates back view of the user who wears the ring 100 and placing two fingers 124 near the ear to listen to the transmitted audio from the ring. The two fingers 124 placed near the ear can reflect the sound emitted by the ring out port towards the ear.

As shown in the FIG. 14 the user can wear the ring 100 on his/her index finger and can place just two fingers 124 near the ear to listen to the transmitted audio. The same concept of reflection of sound in air from solid bodies around is used to keep most of the sound in the area 122 (FIG. 13) so that most of the sound is directed towards the user's ear. In this case, the surface area of the solid bodies that reflect the sound is less as compared to a full hand being placed near the ear, thus the leakage of sound may be higher in the case where the user uses two fingers. In both the cases, the area 122 remains the area of maximum sound and if a person is not in very close proximity of the user, the call still remains private. Thus, users can take phone calls privately even by placing just two adjacent fingers near their ear. Here obviously, one of the finger being used has to be the one on which the ring is worn.

Figure 15:
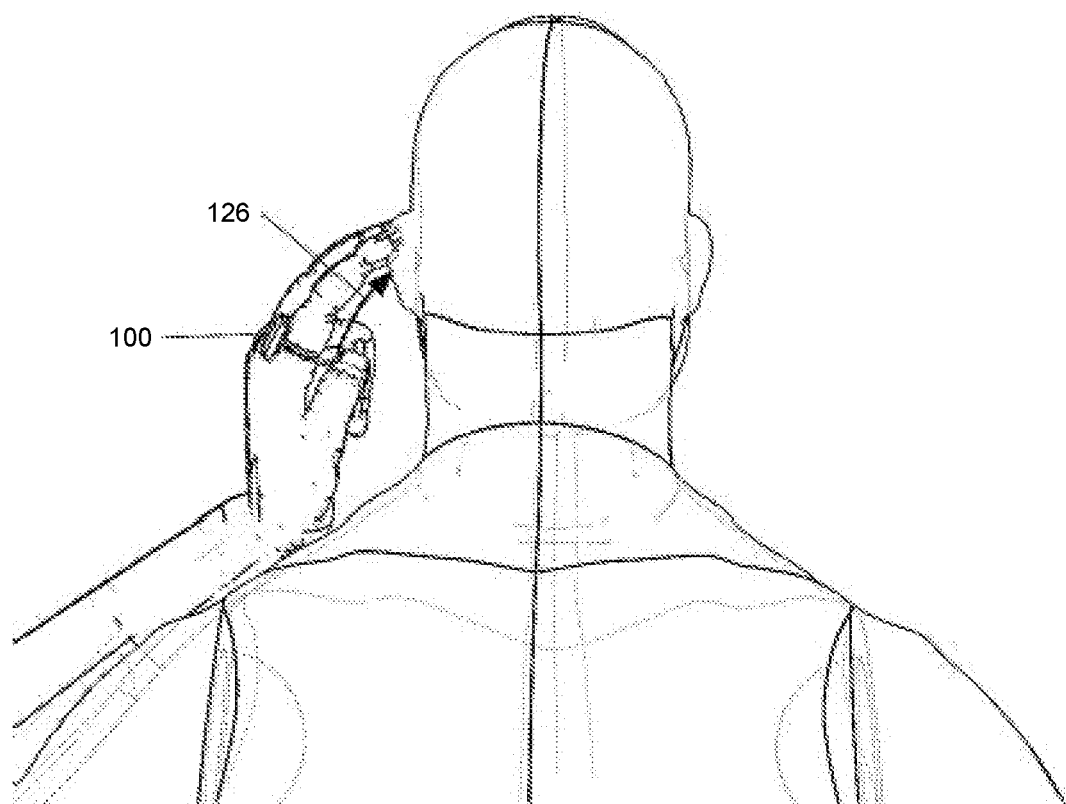

FIG. 15 illustrates exemplary working of the proposed wearable communication device, in accordance with an exemplary embodiment of the present disclosure.

FIG. 15 illustrates back view of the user who wears the ring 100 and placing two fingers 124 (FIG. 14) near the ear to listen the transmitted audio. The two fingers 124 placed near the ear can reflect the sound towards the ear. FIG. 15 depicts the direction of audible sound 126 that can travel from sound out port of the ring to ear.

As shown in the FIG. 15 the user wearing the ring 100 on the index finger and placing just two fingers 124 near the ear to listen to the transmitted audio. The same concept of reflection of sound in air from solid bodies around is used to keep most of the sound in the area 122 (FIG. 13) so that most of the sound is directed towards the user's ear. In this case, the surface area of the solid bodies that reflect the sound is less as compared to a full hand being placed near the ear, thus the leakage of sound may be higher in the case where the user uses two fingers. In both the cases, the area 122 remains the area of maximum sound and if a person is not in very close proximity of the user, the call still remains private. Thus, users can take phone calls privately even by placing just two adjacent fingers near their ear. Here obviously, one of the finger being used has to be the one on which the ring is worn.

Figure 16:
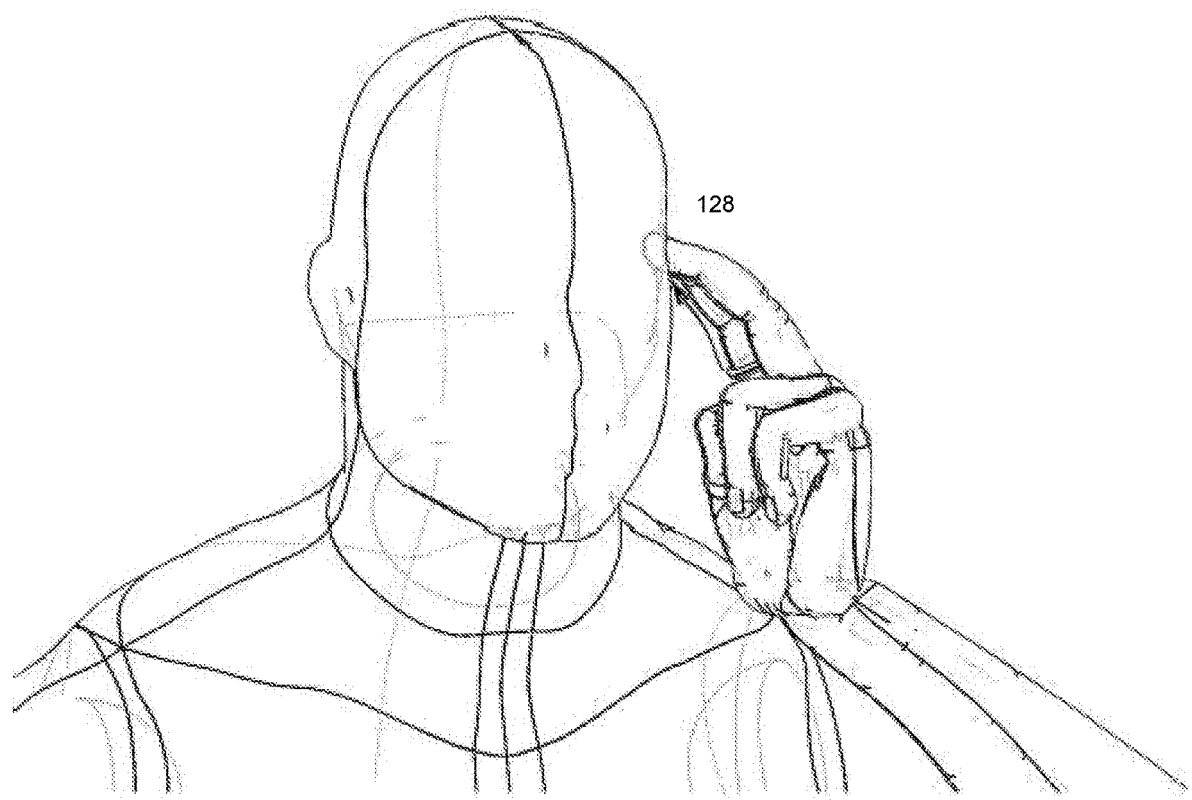

FIG. 16 illustrates another exemplary working of the wearable communication device, in accordance with an exemplary embodiment of the present disclosure.

FIG. 16 illustrates front view of the user who wears the ring and placing two fingers near the ear to listen the transmitted audio. The two fingers placed near the ear can reflect the sound towards the ear. FIG. 16 depicts focusing of sound 128 towards ear.

As shown in the FIG. 16 the user wears the ring on the index finger and places just two fingers near the ear to listen to the transmitted audio. The same concept of reflection of sound in air from solid bodies around is used to keep most of the sound in the area 122 (FIG. 13) so that most of the sound is directed towards the user's ear. In this case, the surface area of the solid bodies that reflect the sound is less as compared to a full hand being placed near the ear, thus the leakage of sound may be higher in the case where the user uses two fingers. In both the cases, the area 122 remains the area of maximum sound and if a person is not in very close proximity of the user, the call still remains private. Thus, users can take phone calls privately even by placing just two adjacent fingers near their ear. Here obviously, one of the finger being used has to be the one on which the ring is worn.

Figure 17:
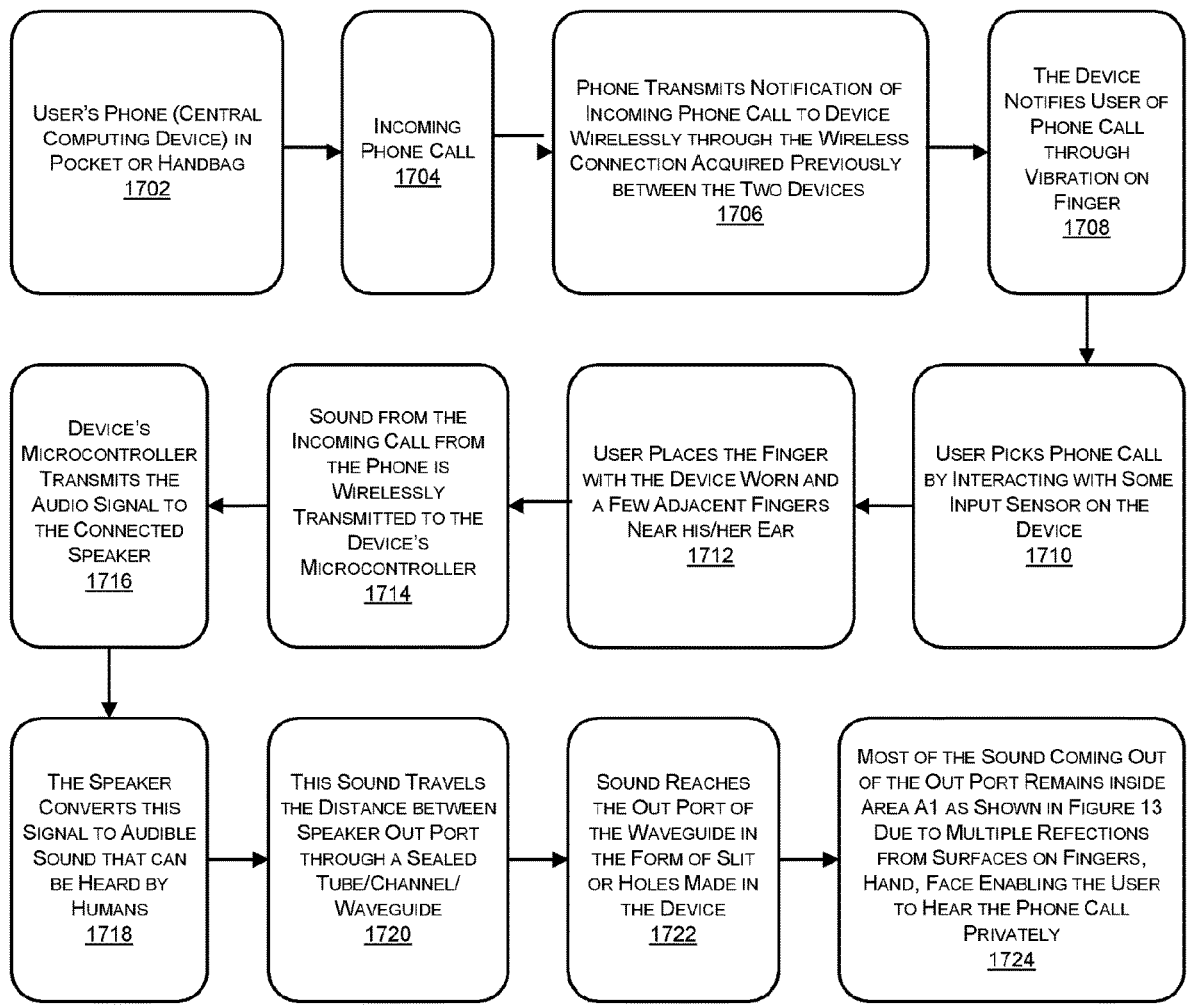
FIG. 17 illustrates by a flowchart an exemplary operation performed using proposed wearable communication device, in accordance with an exemplary embodiment of the present disclosure

FIG. 17 illustrates by a flowchart an exemplary operation performed using proposed wearable communication device, in accordance with an exemplary embodiment of the present disclosure.

At step 1702, phone or computing device/central computing device of a user using proposed ring can be placed inside the pocket or handbag.

At step 1704, the phone or computing device can receive a connection request over a telephone network from a caller.

At step 1706, the phone can transmit/send notification of incoming phone call to the wearable device/ring wirelessly through the wireless connection acquired previously between the two devices.

At step 1708, the device/ring can notify or alert the user about the phone call through vibration on finger (on which proposed ring/device is being worn by the user). In an exemplary embodiment, the ring or device 100 can have LED or alarm to alert or notify the user about the phone call.

At step 1710, the user can pick phone call by interacting with some input sensor on the device.

At step 1712, the user can place the finger with the device worn and a few adjacent fingers near his/her ear.

At step 1714, sound from the incoming call from the phone can be wirelessly transmitted to the device's microcontroller.

At step 1716, microcontroller of the device can transmit the audio signal to the connected speaker.

At step 1718, the speaker can convert this signal to audible sound that can be heard by humans.

At step 1720, this sound can travel the distance between speaker out port through a sealed tube/channel/waveguide.

At step 1722, sound can reach the out port of the waveguide in the form of slit or holes made in the device.

At step 1724, most of the sound coming out of the out port remains inside area 122 as shown in FIG. 13 due to multiple reflections from surfaces on fingers, hand, and face enabling the user to hear the phone call privately.

Figure 18:
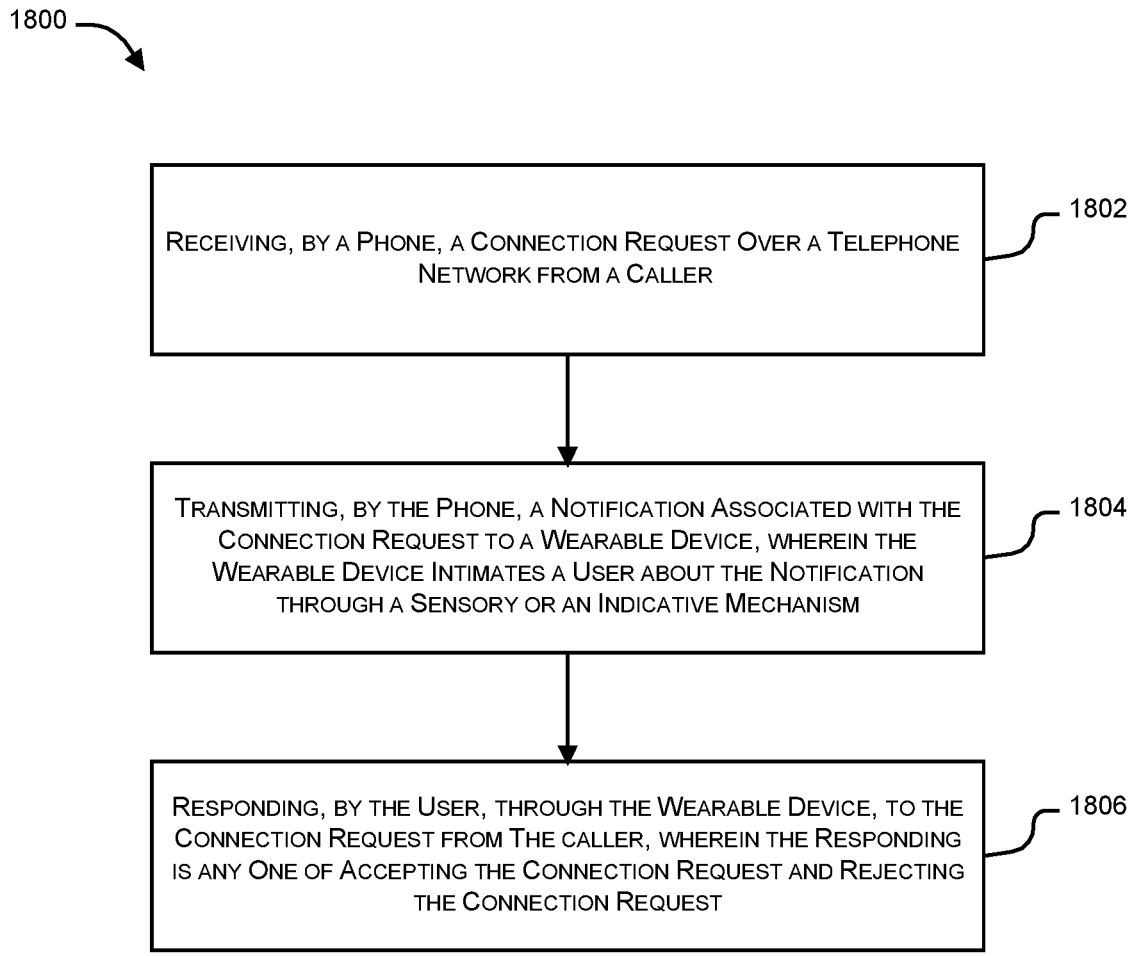
FIG. 18 illustrates an exemplary method for implementation of proposed wearable communication device in accordance with an exemplary embodiment of the present disclosure.
Figure 19:
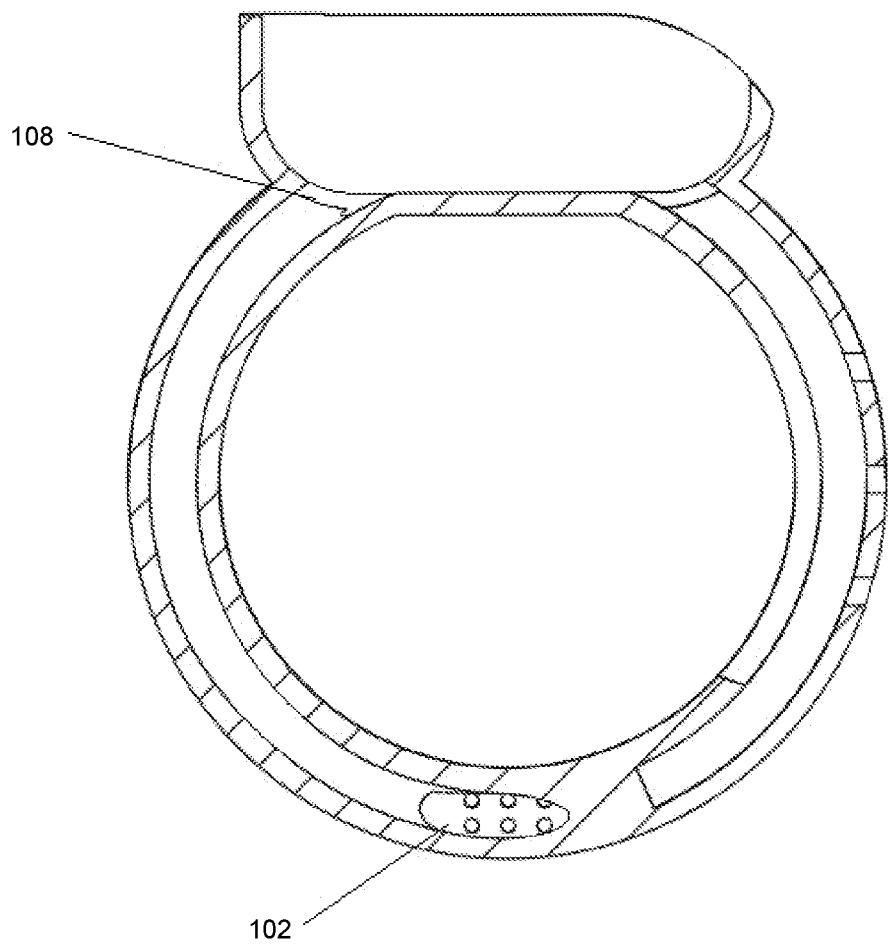
FIGS. 19 to 22 illustrate cross-sections of the proposed wearable communication device to elaborate its working in accordance with exemplary embodiments of the present disclosure.

FIG. 18 illustrates an exemplary method for implementation of proposed wearable communication device in accordance with an exemplary embodiment of the present disclosure.

The method can include, at step 1802, receiving, by a phone, a connection request over a telephone network from a caller, and at step 1804, transmitting, by the phone, a notification associated with the connection request to a wearable device, wherein the wearable device intimates a user about the notification through a sensory or an indicative mechanism.

The method can include, at step 1806, responding, by the user, through the wearable device, to the connection request from the caller, wherein the responding is any one of accepting the connection request and rejecting the connection request. In an exemplary embodiment, the user can pick phone call by interacting with some input sensor on the device. The user can place the finger with the device worn and a few adjacent fingers near his/her ear.

In exemplary embodiment, the device can act as a real time translator wherein a sound sensor on the device can receive sound from a person speaking in a specific language in close proximity of the user. This sound signal can be sent to a processing unit either on the device or on the wirelessly connected computing device or the smartphone and can get translated to a language understood by the user using algorithms on device or the cloud. This translated sound can be sent back to the device's speaker such that the user can hear what the other person wants to say to him/her. In another exemplary embodiment, mobile phone can receive phone call and then the phone or device can translate the language in pre-defined or mother tongue or pre-configured language. The translated language can be transmitted to the speaker that can convert this signal to audible sound that can be heard by humans.

FIGS. 19 to 22 illustrate cross-sections of the proposed wearable communication device to elaborate its working in accordance with exemplary embodiments of the present disclosure.

Figure 20:
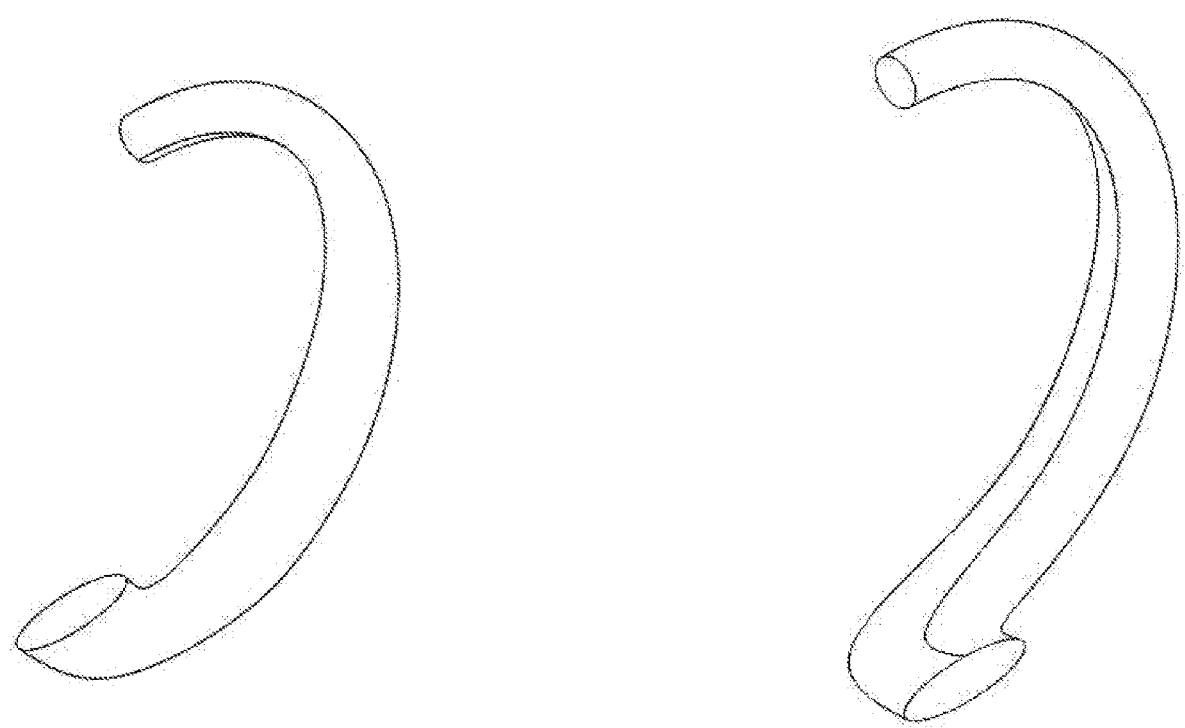
Figure 21:
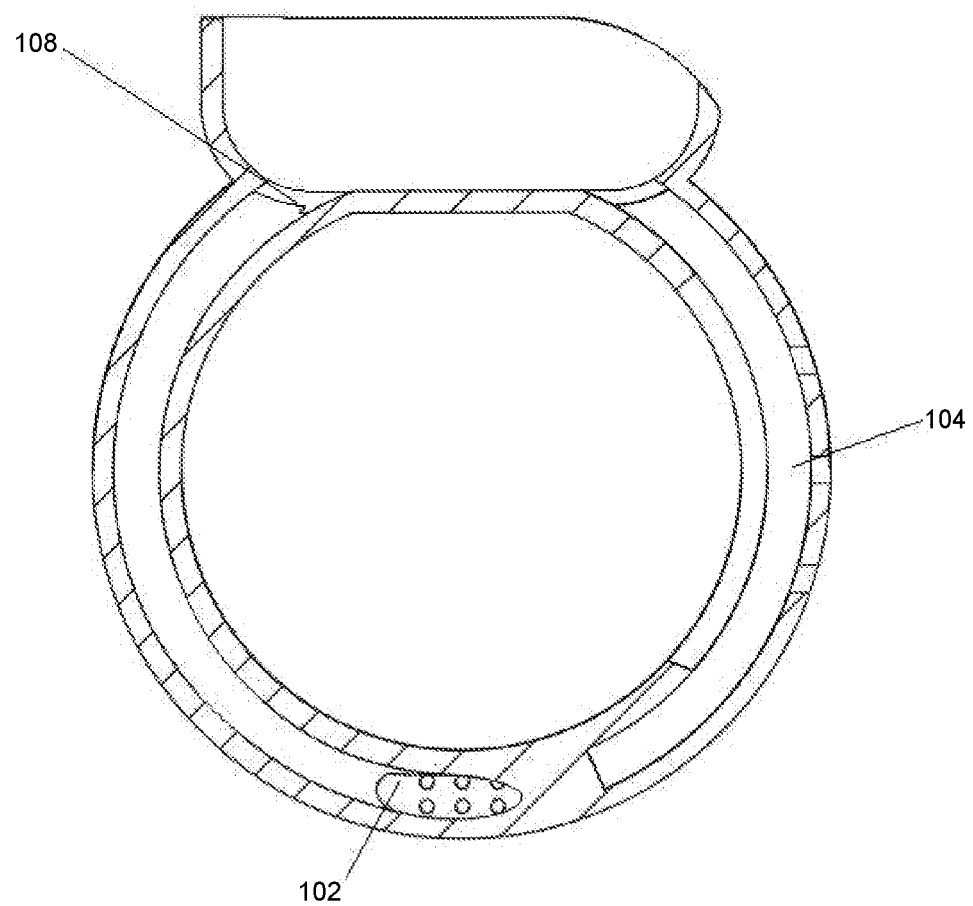
Figure 22:
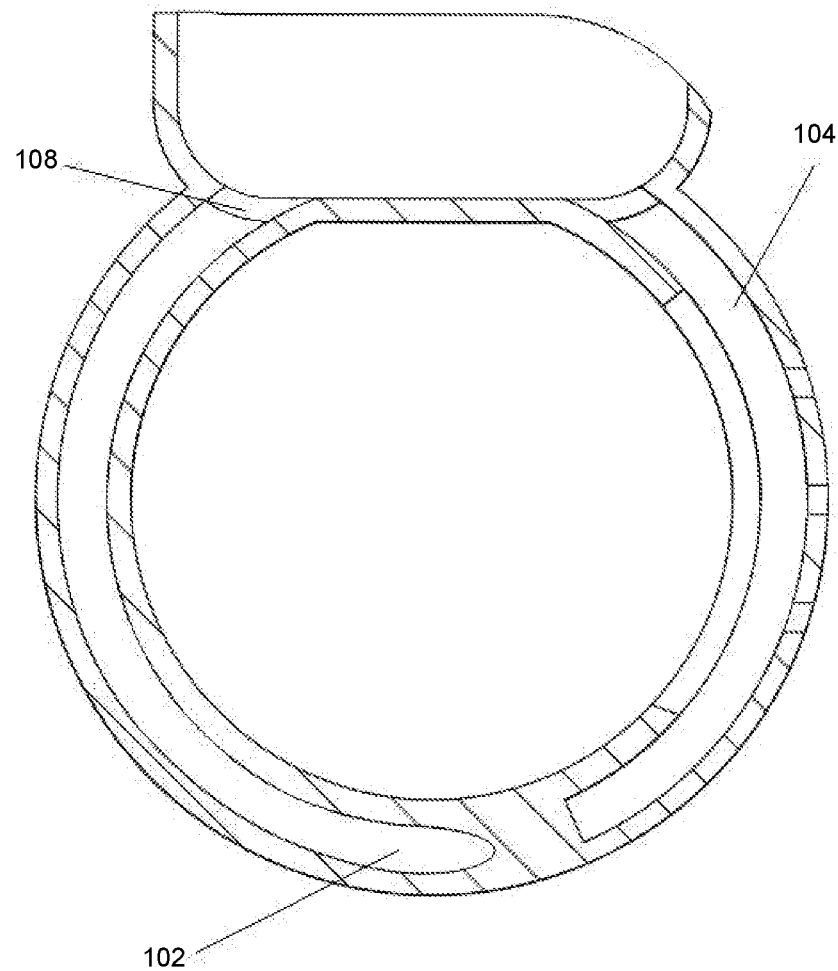

In an embodiment, the ring 100 can be constructed in such a way that hollow tubular structure that connects the sound out port 102 and the speaker placed near 108 in the ring's frontal part is shaped like a curved horn with lesser diameter near 108 end and bigger diameter near the opening 102 so as to further direct the sound and reduce attenuations in the transmitted sound due to abrupt angles made by solid bodies in the channel. The air column through which the sound travels inside the ring is shown in FIG. 20, the increasing diameter of this channel can be seen throughout its section. The sound gets directed because of this horn shape as it reduces the mismatch of acoustic impedance of air just outside the ring at 102 and the acoustic impedance as seen by the speaker just outside the speaker, to maximize sound transfer and give it a direction to propagate towards. The out port can again be made of multiple smaller holes or one single big hole as shown in FIG. 21 and FIG. 22 respectively As shown in FIG. 11 the user wears the ring on the index finger. The user wears the ring on the index finger and raises his hand such that his fingertips just touch the area near his ear. Because of the position of sound out port on the ring and because of the sound that travels through a long tubular structure that connects the speaker and the sound out port, the emitted sound from the out port becomes directed towards the fingertip of the finger on which the ring is worn, so when the user's fingers are just touching his/her ear, the sound gets focused towards the ear. The sound gets directed because of this tubular shape through which it passes through as it modifies the pressure, velocity and acoustic impedance as seen by the speaker just outside the speaker and tries to match it with the acoustic impedance of the air outside the ring at 102 in order to maximize sound transfer and give it a direction to propagate towards with a higher velocity. This position of the user's hand and fingers also creates a space of maximum sound coming from the sound out port of the ring and most of the sound coming out goes towards the user's ears. The sound heard outside the area 122 (As shown in FIG. 13) is very less as most of the sound gets reflected by user's palm, fingers and the face to stay inside the enclosed area. When the sound heard outside area 122 (As shown in FIG. 13) is negligible, as compared to the ambient sound in the environment, the phone call from the ring becomes completely private as nobody in proximity of the user can hear the sound coming from the ring. In this manner, directionality of sound coming due to the provision of the hollow channel and out port on the ring, reflections of this directional sound from the user's finger and face and modifying intensity of sound produced by the speaker as per the ambient noise detected by a sound sensor in the ring/device so that the sound is not too low or loud to lose directionality in the said environment, all combine to ensure that most of the sound emitted by out port stays inside area 122 and the user can take phone calls privately.

To avoid leakage of sound outside area 122, various methods in addition to the ones shared above can be used. One method is to have one or more sound out ports which on superimposition of sound waves and create a maximum sound output region near the user's ear. Another method is to use sound sensor(s) connected to the ring's electronic circuitry to detect ambient noise. This ambient sound level can be used to decide the sound level of the phone call or audio coming from the phone such that the sound coming from the out port of the ring is optimized to not be very loud such that a person standing in close proximity of the user can overhear the conversation, but at the same time, the sound should be loud enough to reach the user's ear and be differentiated from the ambient noise in the environment so that the user can clearly hear the audio transmitted.

Figure 23:
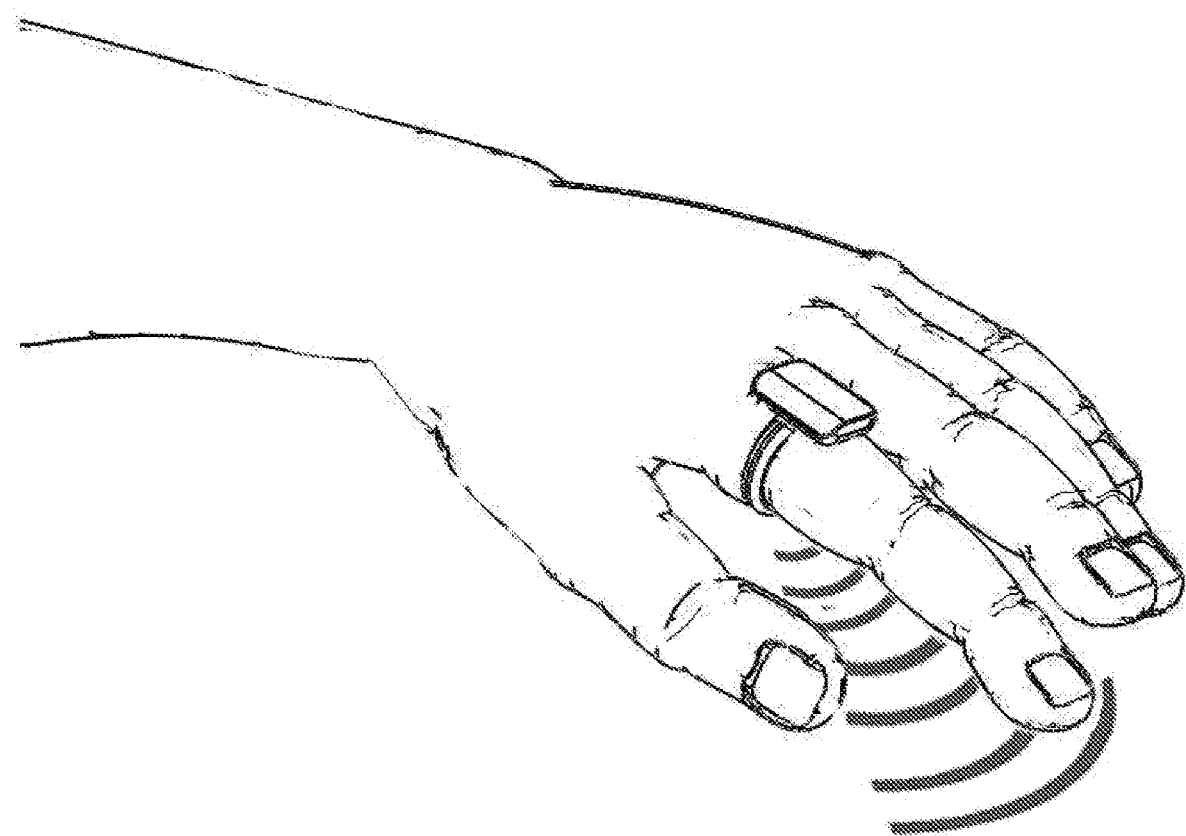
FIG. 23 illustrates how directional sound emitted by proposed wearable communication device may be used for sound based financial transactions in accordance with an exemplary embodiment of the present disclosure.

FIG. 23 illustrates how directional sound emitted by proposed wearable communication device may be used for sound based financial transactions in accordance with an exemplary embodiment of the present disclosure.

In an exemplary embodiment, as shown in FIG. 23, since the sound emitted by the ring is directional in nature and can be heard only in close vicinity of the hand, the proposed ring can be used in sound based financial transactions where the user places the hand on which ring is worn near a POS device or a mobile phone with a mic to detect sound signals. The ring generates an encrypted sound signal that may have been initiated from the phone through a wireless connection, this sound signal has secure information and enables or approves the transaction, this encrypted sound signal is decrypted and interpreted by the POS device with a mic or the receiving mobile phone which has the same software used to encrypt the sound and the transaction is executed. The encryption and decrypting software to generate the sound and decrypt the sound could have been made by third parties that work on encrypted sound technology. This way, just by placing a finger near a device with a suitably configured sound sensor (such as a mic) and decryption software, the user can make payments without the need to take cards or cell phone out of the pocket. The same method of transmitting encrypted sound as passwords through the ring can be used to unlock smart devices, locks etc that have a mic attached to receive sound as a signal. This can also be used to transact between two different finger worn devices/rings as being described herein with a mic and a speaker with the disclosed directional sound components and structure, enabling user to make payments and share information like contact details with a friend wearing another device with just a handshake. Transactions can be associated with transactional payments based on Unstructured Supplementary Service Data or Short Message Service, direct operator billing, credit card mobile payments, online wallets, QR code payments, contactless NFC, cloud-based mobile payments, audio signal-based payment, Bluetooth Low Energy signal beacon payment, in-application payment, Software Development Kit payment, Application Programmable Interface payment, social networking payment, and direct carrier/bank co-operation.

It may be appreciated that the proposed ring or wearable device can be used in virtual reality (VR) applications and augmented reality (AR) applications.

In some embodiments, the ring can be used to control a variety of different external electronic devices (interchangeably termed as remote devices herein). For example, the external electronic device may be a camera, and the ring computing device may be paired thereto and control (via the wireless link) the camera's shutter, zoom, focus, f-stop, or any other control via a tap, gesture, or hand gesture. When paired with a desktop or laptop computer, the ring may be used as a mouse, as a scroll wheel, as a task switcher, for cutting and pasting, or for any other similar task. Such use of the ring may permit the user to perform such functions, normally relegated to computer mice or special keyboard keys, without removing his or her fingers from the home keyboard row, thus increasing productivity. In some embodiments, the ring computing device recognizes a swiping or flicking hand gesture of the user and sends a command to the external electronic device to change input fields in, e.g., a web page input form. Use of the ring as a mouse or similar function may trigger the ring computing device and/or paired computer to disable the computer touch pad to thereby prevent errant gestures made thereto.

In other embodiments, the ring may be paired with an automobile audio system, cruise control system, heating/cooling system, navigation system, or entertainment system and thus permit the user to control said systems without needing to remove his or her hands from the steering wheel, gear shift, or other control. The ring may be similarly paired with active-display eyeglasses, thermostats, or appliances. If paired with a smart watch, the control dial of the ring may be used in lieu of or in conjunction with the crown of the watch to thereby permit one-handed control of the smart watch (i.e., the hand upon which the watch is worn may also be used to control the watch, rather than the user's opposing hand) and/or two-handed control of the watch (i.e., the ring may be used to manipulate the functionality provided by the watch crown and the opposing hand can be used to control the watch). The ring may further be paired with a video game controller or video game system and be used to control a video game or be used in conjunction with a video game controller to control a video game.

The ring optionally also includes one or more proximity sensors. The proximity sensor can be coupled with peripherals interface. Alternately, proximity sensor is coupled with input controller in I/O subsystem. In some embodiments, the proximity sensor turns off and disables touch-sensitive display system when the multifunction device is placed near the user's ear (e.g., when the user is making a phone call).

The ring can include one or more electronic, electrical, or other components, such as microprocessors, input devices, buttons, ports, adapters, controllers, displays, ports, data-exchange devices, wireless devices, antennas, accelerometers, speakers, microphones, cameras, headphone/microphone/speaker jacks, sensors, vibrators, haptic technology, keyboards, membrane switches, heat sinks, batteries, storage devices (such as hard drives, flash memory, solid state drives, memory cards, etc.), communications devices, modems, interface devices, lights or indicators (such as LED lights), digitizers, RFID readers, RFID transmitters, solar panels, music or media players, voice recognition devices and software, etc. Adapters can include USB adapters, Bluetooth adapters, wireless adapters, Wi-Fi adapters, cellular adapters, FireWire adapters, Ethernet adapters, infrared adapters, etc.

The ring can have a display, touch-sensitive surface and/or one or more sensors to detect the intensity of a contact with the touch-sensitive surface so as to enable faster, more efficient methods and interfaces for controlling external electronic devices, thereby increasing the effectiveness, efficiency, and user satisfaction with such devices. For example, the ring is more portable than a mouse, doesn't require a computer, doesn't require eye contact with the touch screen, allows the user to not be tied to a computer, cellular phone, or tablet to certain control electronic devices (e.g., televisions), reduces the inefficiencies of mode switching by not requiring a user to move his or her hand off a keyboard to move a mouse or touchpad, and is smaller, more portable, and less obtrusive than existing devices. The ring can be operated using a single hand; and does not need to be put aside when, for example, the user needs to hold another object. The ring can also receive information from external devices in the form of messages or images on a touchscreen, pulses or vibrations of haptic actuators, and sound. Such methods and interfaces may complement or replace conventional methods for controlling external electronic devices or to receive and reply to information from external electronic devices, including other ring computing devices.

The ring can be made waterproof or water resistant. For example, it can be encapsulated or sealed into a waterproof or water resistant pouch, or sealed by vacuum sealing, heat sealing, or any suitable method. It can be washable and/or submersible.

The wearable communication device (ring) can be made of flexible material. In some cases, the entire device, a portion of the device, a display and/or input device component, etc. can be bent, creased, folded, curled, curved, crumpled, crinkled, etc.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

It should be apparent to those skilled in the art that many more modifications besides those already described are possible without departing from the inventive concepts herein. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

Therefore, while the embodiments herein have been described in terms of preferred embodiments, those skilled in the art will recognize that the embodiments herein can be practiced with modification within the scope of the appended claims. The disclosure is not limited to these embodiments only. Numerous modifications, changes, variations, substitutions, and equivalents will be apparent to those skilled in the art, without departing from the scope of the disclosure, as described in the claims.

In the description of the present specification, reference to the term "one embodiment," "an embodiments", "an example", "an instance", or "some examples" and the description is meant in connection with the embodiment or example described The particular feature, structure, material, or characteristic included in the present invention, at least one embodiment or example. In the present specification, the term of the above schematic representation is not necessarily for the same embodiment or example. Furthermore, the particular features structures, materials, or characteristics described in any one or more embodiments or examples in proper manner. Moreover, those skilled in the art can be described in the specification of different embodiments or examples are joined and combinations thereof.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

Accordingly, while the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

ADVANTAGES OF THE INVENTION

The present disclosure provides for wearable communication device that is worn on the finger of a user to let the user handle phone calls by placing his/her fingers near his/her ear.

The present disclosure provides for a wearable communication device that is controlled by voice, motion, orientations, buttons or a touch panel set on the surface thereof so as to provide a corresponding functions to a user.

The present disclosure provides for a wearable communication device that enables the user interact with and/or control external electronic devices.

The present disclosure provides for a wearable communication device that notifies the user of an incoming phone call received on an associated mobile or smartphone.

The present disclosure provides for a wearable communication device that can be used in security based application by bodyguards, by spies, by regular consumers of smartphones, in voice based interactions to control connected devices, smart home, in emergency situations where taking a phone out of the pocket/handbag to call police is not an option, in locking/unlocking devices where the sound coming out of the ring acts as a code to unlock a device which has a microphone built in to detect this code.

I claim:

1. A ring shaped wearable communication device (ring) configured to be worn on a finger of a user's hand, said ring comprising:
a sound sensor (mic) configured to detect ambient sound levels;
a speaker configured to produce sound in human audible frequency range per at least one signal received, wherein intensity of said sound produced is based on said ambient sound level;
a plurality of out ports; and
a hollow channel with an increasing cross-section configured to wrap around said finger,
wherein:
smaller cross-section end of said hollow channel is connected to said speaker and the other end of said hollow channel is connected to said plurality of out ports to provide a horn-like structure;
said plurality of out ports and said hollow channel are configured to reduce mismatch between acoustic impedance of air immediately outside said plurality of out ports and acoustic impedance as seen by said speaker just outside said speaker; and
said plurality of out ports emit sound received from said speaker, wherein sound waves associated with the produced sound, from the plurality of out ports, are superimposed to create maximum sound output in close vicinity of said user's hand.

2. The ring of claim 1, wherein said ring comprises at least one microphone and a connection circuit to enable two-way communication and connection between said ring and a computing device said ring is operatively connected to; wherein the speaker produces said sound in human audible frequency range based on signals received from said computing device, and said at least one microphone transfers sound of said user to said computing device; and wherein said connection circuit uses any of wired or wireless means.

3. The ring of claim 1, wherein the ring comprises at least one sensor configured to provide at least one corresponding function to said user.

4. The ring of claim 1, wherein said directional sound is configured for, based upon any or a combination of sound produced by said speaker and actions performed by said user on or in vicinity of said ring, any or a combination of:
operating any or a combination of an external device, a computer application, and a lock, and
carrying encrypted information.

5. The ring of claim 2, wherein said computing device is a smart phone and said ring is configured to receive a notification from said smart phone upon receipt of a phone call at said smart phone, and accept said notification to enable said two-way communication, wherein said acceptance is based on an action performed by said user on said ring.

6. The ring of claim 1, wherein the plurality of said out ports are configured at different locations on said hollow channel.

7. The ring of claim 1, wherein said speaker is configured to provide said sound after removing and/or adding at least one other signal of a pre-determined frequency, using Digital Signal Processing on said at least one signal.

8. The ring of claim 3, wherein said at least one sensor comprises any or a combination of a voice sensor, a motion sensor, an orientation sensor, a touch sensor, a vibration sensor and a proximity sensor.

9. The ring of claim 8, wherein said proximity sensor facilitates secure data communication among any or a combination of a plurality of said rings and at least one computing device.

10. A ring shaped wearable communication device (ring) configured to be worn on a finger of a user's hand, said ring comprising:
a sound sensor (mic) configured to detect ambient sound levels;
a speaker configured to produce sound in human audible frequency range per at least one signal received, wherein intensity of said sound produced is based on said ambient sound level;

a plurality of out ports; and
a hollow channel having a tube with an increasing cross-section configured to wrap around said finger wherein:
  smaller cross-section end of said tube is connected to said speaker and the other end of said tube is connected to said plurality of out ports to provide a horn-like structure;
  said plurality of out ports and said tube are configured to reduce mismatch between acoustic impedance of air immediately outside said plurality of out ports and acoustic impedance as seen by said speaker just outside said speaker; and
  said plurality of out ports emit sound received from said speaker, wherein sound waves associated with the produced sound, from the plurality of out ports, are superimposed to create a maximum sound output in close vicinity of said user's hand.

* * * * *